(12) United States Patent
Tsuchiya

(10) Patent No.: US 7,974,188 B2
(45) Date of Patent: Jul. 5, 2011

(54) REPEATER AND COMMUNICATION METHOD

(75) Inventor: Masahiko Tsuchiya, Tokyo (JP)

(73) Assignee: NEC Corporation, Tokyo (JP)

(*) Notice: Subject to any disclaimer, the term of this patent is extended or adjusted under 35 U.S.C. 154(b) by 107 days.

(21) Appl. No.: 12/404,014

(22) Filed: Mar. 13, 2009

(65) Prior Publication Data
US 2009/0245099 A1    Oct. 1, 2009

(30) Foreign Application Priority Data
Mar. 25, 2008   (JP) .................................. 2008-077644

(51) Int. Cl.
*G01R 31/08* (2006.01)
(52) U.S. Cl. ........................................................ 370/226
(58) Field of Classification Search .................. 370/315, 370/341, 226; 455/520, 509, 560
See application file for complete search history.

(56) References Cited

U.S. PATENT DOCUMENTS
2008/0259923 A1 * 10/2008 Bryant et al. ................. 370/392

FOREIGN PATENT DOCUMENTS
| JP | 1994132959 A | 5/1994 |
| JP | 2003258877 A | 9/2003 |
| JP | 2003258905 A | 9/2003 |
| JP | 2004282176 A | 10/2004 |
| JP | 2006229700 A | 8/2006 |
| JP | 3918859 B | 5/2007 |

* cited by examiner

*Primary Examiner* — Ricky Ngo
*Assistant Examiner* — Chandrahas Patel

(57) ABSTRACT

A repeater for sending and receiving a routing message for changing routing information determines whether a routing message received from a first adjacent repeater which is disposed adjacent to the repeater is to be sent or not. If it is judged that the routing message is not to be sent, then the repeater generates a pseudo-routing message and sends the generated pseudo-routing message, instead of the routing message received from the first adjacent repeater, to a second adjacent repeater which is disposed adjacent to the repeater.

21 Claims, 21 Drawing Sheets

REPEATER AND COMMUNICATION METHOD

This application is based upon and claims the benefit of priority from Japanese patent application No. 2008-077644, filed on Mar. 25, 2008, the disclosure of which is incorporated herein in its entirety by reference.

BACKGROUND OF THE INVENTION

1. Field of the Invention

The present invention relates to a repeater and a communication method for a packet communication network, and more particularly to a repeater and a communication method for sending and receiving a routing message according to a routing protocol.

2. Description of the Related Art

Routers for routing and forwarding packets in a packet communication network exchange packet relaying information called routing information between themselves and adjacent routers for accurately transmitting packets to dynamically changing packet destinations. The exchanged routing information keeps up to date routing tables which contain information representing an association between the addresses of destinations for packets to be relayed by routers and adjacent routers for relaying packets.

A protocol for exchanging routing information between adjacent routers is referred to as a routing protocol. According to the routing protocol, adjacent routers exchange not only routing information but also packets for confirming a connection between them thereby to detect a fault of such adjacent routers.

When a router detects a fault of an adjacent router in a packet communication network, the router which has detected the fault exchanges routing information for bypassing the faulty router between itself and an adjacent router other than the faulty router. The routers which have exchanged the routing information further exchange routing information with other routers adjacent thereto. In this manner, triggered by the fault of one router, exchanged routing information spreads to routers in the packet communication network, and each of the routers updates its routing table based on the exchanged routing information.

A large-scale packet communication network including many interconnected routers requires large-sized routing tables which pose a very high load on the CPU of each router for performing a routing table updating process. A router has a function to reboot itself to initialize its internal information for continuing normal operation when the load on its CPU becomes very high. If the routing table updating process spreads throughout the entire packet communication network, then many routers are caused to reboot themselves, tending to give rise to a communication shutdown in the packet communication network. When the faulty router recovers, routing information is exchanged again between the adjacent routers, making the overall packet communication network unstable.

According to one solution to the above problems, a function to send and receive packets for confirming connections and a function to send, receive, and store routing information, which are normally performed by a repeating controller, are carried out by packet repeaters for forwarding packets to adjacent routers. Therefore, even in the event of a failure of the repeating controller, routing protocol packets can properly be sent to and received from adjacent routers. The above technology is disclosed in Patent document 1 shown below.

According to the above technology, even when the repeating controller of a router suffers a fault, since packets for confirming connections are sent and received, adjacent routers do not the fault, and routing information is prevented from being exchanged between the adjacent routers and other routers. As routing information is continuously sent from the adjacent routers to the faulty router, the faulty router does not need to exchange routing information with the adjacent routers upon recovery from the failure by using the routing information which the repeating controller has received from the adjacent routers and stored during the fault. Therefore, the routers are prevented from suffering a chain of self rebooting due to the routing table updating process spreading through the packet communication network.

Patent document 1: JP-A No. 2003-258877

As described above, the technology disclosed in Patent document 1 makes it possible to avoid a communication shutdown in the entire packet communication network owing to a router fault. However, if a fault occurs in a communication path between routers, rather than a router itself, then since the routers are unable to send and receiver packets for confirming connections, they detect the fault and exchange routing information with adjacent routers in order to bypass the faulty route. In this case, if the routers are not prevented from suffering a chain of self rebooting due to the routing table updating process spreading through the packet communication network, then it is not possible to avoid a communication shutdown in the entire packet communication network owing to a router fault.

SUMMARY OF THE INVENTION

It is an object of the present invention to provide a repeater and a communication method for preventing routers from suffering a chain of self rebooting due to routing information exchanged between the routers based on fault information upon a fault of a router or a communication path between routers, as the exchanged routing information spreads through a packet communication network.

To achieve the above object, there is provided in accordance with the present invention a repeater for sending and receiving a routing message for changing routing information, comprising:

a fault information receiver for receiving fault information sent from a first adjacent repeater which is disposed adjacent to the repeater;

a repeating device for receiving a routing message from the first adjacent repeater and sending the received routing message to a second adjacent repeater which is disposed adjacent to the repeater;

a repeating suppressor for analyzing the routing message from the first adjacent repeater and determining whether the routing message from the first adjacent repeater is to be sent or not; and a proxy responder for generating and sending a pseudo-routing message to the second adjacent repeater, instead of the routing message from the first adjacent repeater;

wherein if the repeating suppressor judges that the routing message from the first adjacent repeater is to be sent, the repeating suppressor returns the routing message to the repeating device, and if the repeating suppressor judges that the routing message from the first adjacent repeater is not to be sent, the repeating suppressor does not return the routing message to the repeating device, and sends the result of analysis of the routing message to the fault information receiver;

the repeating device sends the routing message returned from the repeating suppressor to the second adjacent repeater;

the fault information receiver instructs the proxy responder to generate and send a pseudo-routing message based on the result of analysis of the routing message from the repeating suppressor or the fault information; and when instructed by the fault information receiver, the proxy responder generates the pseudo-routing message and sends the generated pseudo-routing message to the second adjacent repeater.

According to the present invention, there is also provided a communication method to be carried out by a repeater for sending and receiving a routing message for changing routing information, comprising the steps of:

receiving fault information sent from a first adjacent repeater which is disposed adjacent to the repeater;

analyzing the routing message from the first adjacent repeater and determining whether or not the routing message from the first adjacent repeater is to be sent;

if it is judged that the routing message from the first adjacent repeater is to be sent, sending the routing message to a second adjacent repeater which is disposed adjacent to the repeater;

if it is judged that the routing message from the first adjacent repeater is not to be sent, generating a pseudo-routing message to be sent to the second adjacent repeater, instead of the routing message from the first adjacent repeater, based on a result of analysis of the routing message or fault information sent from the first adjacent repeater; and sending the generated pseudo-routing message to the second adjacent repeater.

According to the present invention, in the event of a fault of a router or a communication path between routers of a packet communication network, the routers are prevented from suffering a chain of self rebooting due to the changing of routing information spreading through the packet communication network, so that the packet communication network will be prevented from suffering a communication shutdown.

The above and other objects, features, and advantages of the present invention will become apparent from the following description with reference to the accompanying drawings which illustrate examples of the present invention.

DESCRIPTION OF THE PREFERRED EMBODIMENTS

Repeaters and communication methods according to preferred exemplary embodiments, which use BGP (Border Gateway Protocol) as the routing protocol, will be described below.

According to the BGP, adjacent routers establish a TCP (Transmission Control Protocol) connection therebetween, establish a routing session on the TCP connection, and exchange routing messages to perform a routing process and exchange routing information. The routing messages include four types of routing messages, i.e., an OPEN message, an UPDATE message, a KEEPALIVE message, and a NOTIFICATION message.

The OPEN message is a message exchanged for the first time between adjacent routers in order to establish a routing session after a TCP connection is established.

The UPDATE message is a message used to send mutual routing information to the adjacent routers after the routing session is established.

Figure 1:
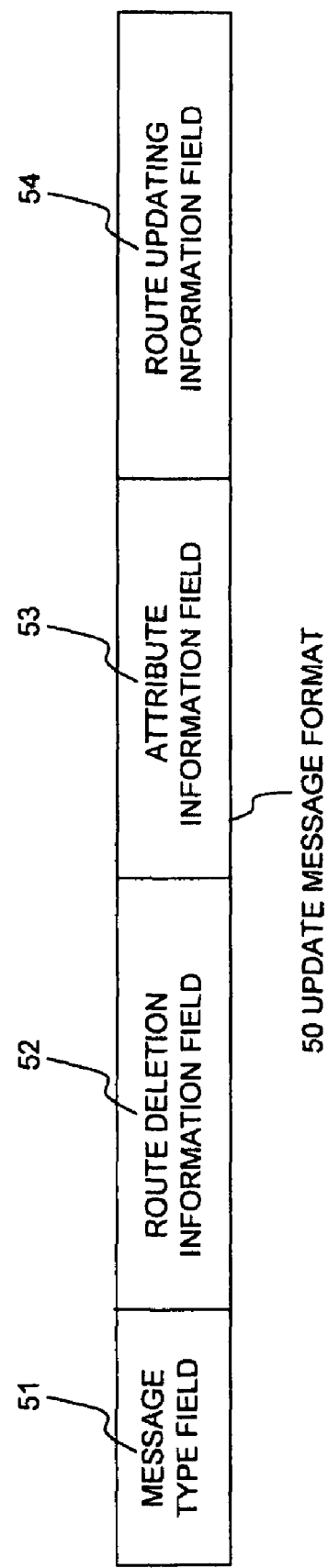
FIG. 1 is a diagram showing the format of an UPDATE message.

FIG. 1 is a diagram showing the format of an UPDATE message. The UPDATE message format, denoted by 50, comprises message type field 51, route deletion information field 52, attribute information field 53, and route updating information field 54.

Message type field 51 indicates that the message is an UPDATE message.

Route deletion information field 52 contains information requesting a router to which the UPDATE message is to be transmitted to delete a route. Attribute field 53 and route updating information 54 contain information requesting a router to which the UPDATE message is to be transmitted to update a route.

The KEEPALIVE message is a message used to maintain a routing session, and is transmitted between adjacent routers. If a KEEPALIVE message does not arrive at a router from an adjacent router within a hold time determined when a routing session is established, then the router judges that the adjacent router breaks down, and cuts off the routing session. The KEEPALIVE message is normally transmitted at intervals which are ⅓ of the hold time.

The NOTIFICATION message is a message which is transmitted from a router to an adjacent router when the router suffers a fault and judges that it is unable to continue the routing function thereof after a routing session is established. Upon reception of the NOTIFICATION message, the adjacent router immediately cuts off the routing session with the faulty router.

1st Exemplary Embodiment

Figure 2:
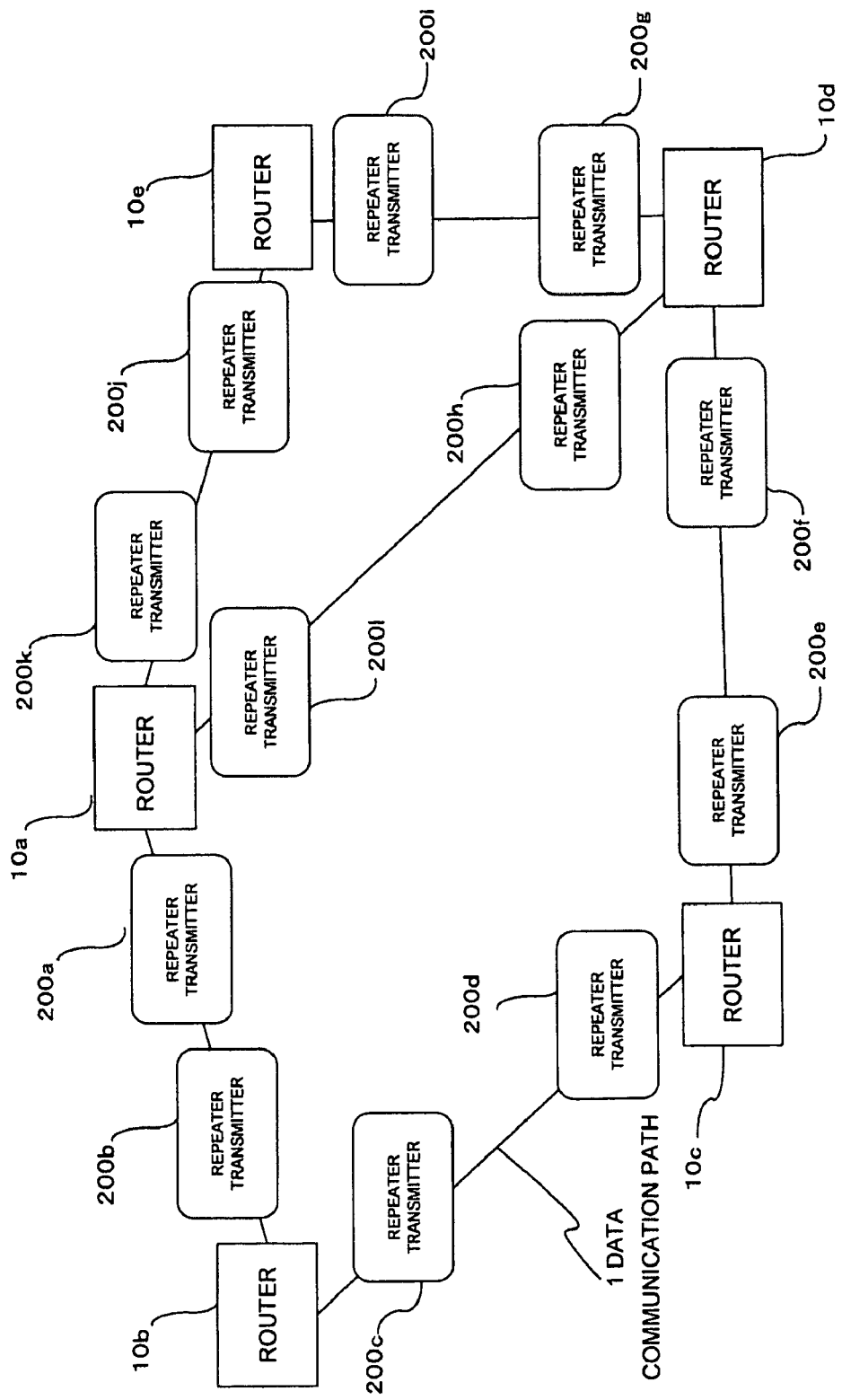
FIG. 2 is a block diagram of a communication system incorporating repeaters according to a first exemplary embodiment of the present invention.

FIG. 2 is a block diagram of a communication system incorporating repeaters according to a first exemplary embodiment of the present invention.

As shown in FIG. 2, the communication system according to the first exemplary embodiment comprises routers 10*a* through 10*e* serving as repeaters and repeater transmitters 200*a* through 200*l*. Routers 10*a* through 10*e* and repeater transmitters 200*a* through 200*l* are interconnected by data communication path 1.

Figure 3:
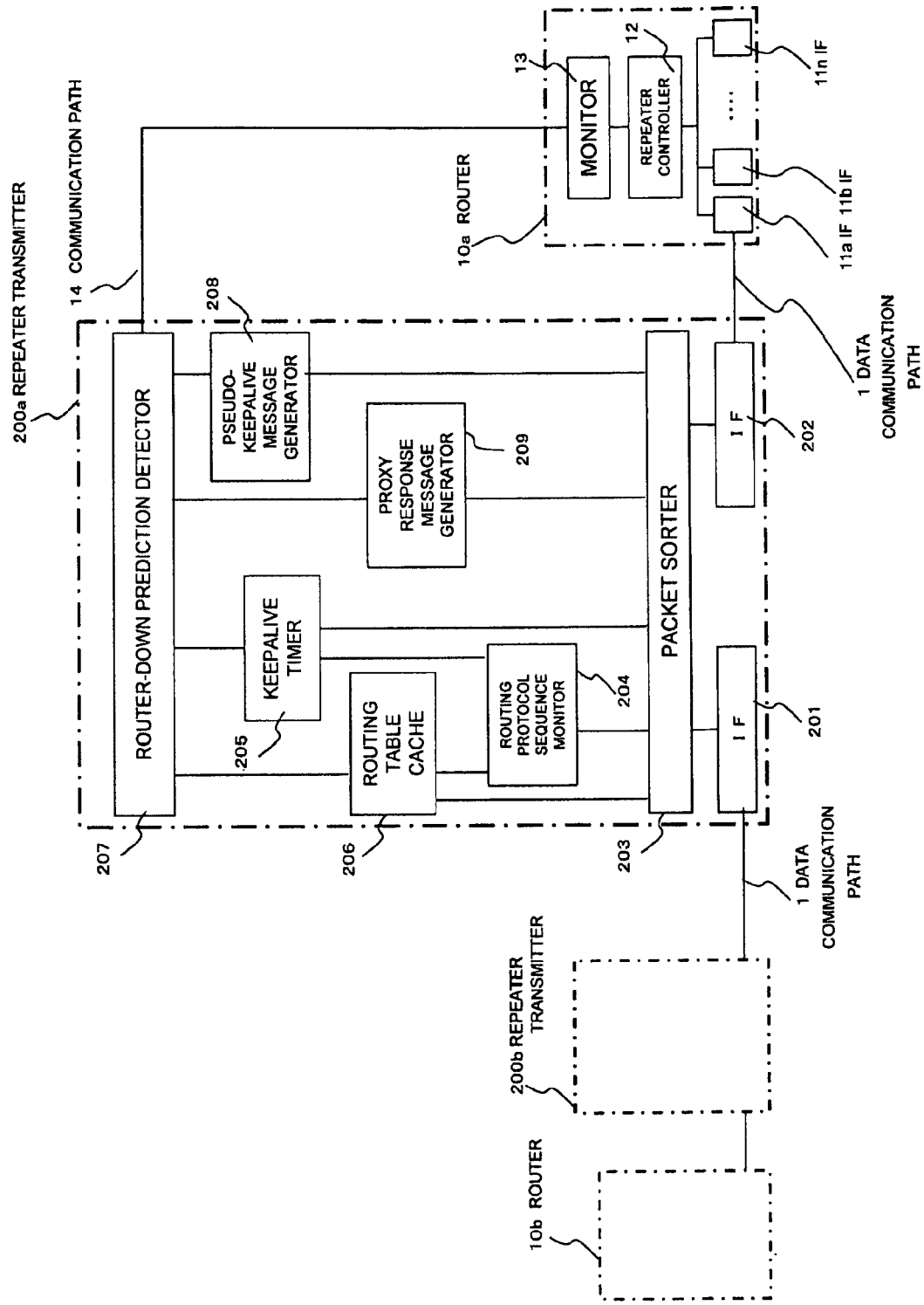
FIG. 3 is a block diagram illustrative of the functions of a repeater transmitter and a router in the communication system shown in FIG. 2.

FIG. 3 is a block diagram illustrative of the functions of repeater transmitter 200*a* and router 10*a* in the communication system shown in FIG. 2. Other routers 10*b* through 10*e* and repeater transmitters 200*b* through 200*l* shown in FIG. 2 are identical in configuration to router 10*a* and repeater transmitter 200*a*.

As shown in FIG. 3, router 10*a* comprises a plurality of IFs (interfaces) 11*a* through 11*n*, repeater controller 12, and monitor 13.

IFs 11*a* through 11*n* receive a packet from data communication path 1 and sends the packet to repeater controller 12. IFs 11*a* through 11*n* receive a packet from repeater controller 12 and sends the packet to data communication path 1.

Repeater controller 12 receives a packet from either one of IFs 11*a* through 11*n*, refers to a routing table with respect to the received packet, and sends the packet to either one of IFs 11*a* through 11*n* depending on the destination address from the routing table.

Monitor 13 monitors the manner in which the hardware and software of router 10*a* operate. If router 10*a* is about to suffer a fault tending to cause router 10*a* to break down, then monitor 13 sends router-down prediction information to that effect to repeater transmitter 200*a*.

Repeater transmitter 200*a* comprises a pair of IFs (interfaces) 201, 202, packet sorter 203 as a repeating device, routing protocol sequence monitor 204, KEEPALIVE timer 205 as a repeating suppressor, routing table cache 206 as a repeating suppressor and a storage, router-down prediction detector 207 as a fault information receiver, pseudo-KEEPALIVE message generator 208 as proxy responder, and proxy response message generator 209 as proxy responder.

IFs 201, 202 receive a packet from data communication path 1, and sends the packet to packet sorter 203. IFs 201, 202 also receive a packet from packet sorter 203 and sends the packet to data communication path 1.

Packet sorter 203 sorts out a packet received via IFs 201, 202 into a data packet or a routing protocol packet. Packet sorter 203 removes a header from the routing protocol packet, and sends only a routing message thereof to routing protocol sequence monitor 204. Packet sorter 203 does not process the data packet and returns the data packet as is to IF 201 or 202. When sending the routing message, packet sorter 203 adds a header to the routing message, and sends them as a routing protocol packet to IF 201 or 202.

Routing protocol sequence monitor 204 determines the message type of the routing message received from packet sorter 203. If the received message is a KEEPALIVE message, then routing protocol sequence monitor 204 sends it to KEEPALIVE timer 205. If the received message is an UPDATE message, then routing protocol sequence monitor 204 sends it to routing table cache 206.

KEEPALIVE timer 205 manages the reception time of the KEEPALIVE message, and confirms if the KEEPALIVE message received from routing protocol sequence monitor 204 has been sent in a predetermined defined transmission interval or not. If the KEEPALIVE message has not been received in the predetermined defined transmission interval, then KEEPALIVE timer 205 sends router-down prediction information to that effect to router-down prediction detector 207.

If the KEEPALIVE message has been received in the predetermined defined transmission interval, then KEEPALIVE timer 205 returns the received KEEPALIVE message as is to packet sorter 203. If the KEEPALIVE message has not been received after elapse of a predetermined defined time from the previously received time, then KEEPALIVE timer 205 autonomously sends router-down prediction information to that effect to router-down prediction detector 207.

Routing table cache 206 stores an UPDATE message sent and received between adjacent routers. Routing table cache 206 compares the contents of the stored UPDATE message with route deletion information field 52 (see FIG. 1), attribute information field 53 (see FIG. 1), and route updating information field 54 (see FIG. 1) contained in the UPDATE message received from routing protocol sequence monitor 204, and analyzes them. Routing table cache 206 determines whether a load imposed due to a routing table updating process in an adjacent router by sending the contents of the received UPDATE message to the adjacent router exceeds the processing capability of the CPU of the adjacent router or not. If routing table cache 206 judges that the load imposed by sending the contents of the received UPDATE message does not exceed the processing capability of the CPU of the adjacent router, then routing table cache 206 stores the received UPDATE message and returns the UPDATE message as is to packet sorter 203.

Conversely, if routing table cache 206 judges that the load imposed by sending the contents of the received UPDATE message exceeds the processing capability of the CPU of the adjacent router, then routing table cache 206 sends router-down prediction information to that effect to router-down prediction detector 207. Routing table cache 206 also sends the stored UPDATE message to router-down prediction detector 207.

When router-down prediction detector 207 receives router-down prediction information from KEEPALIVE timer 205, routing table cache 206, or monitor 13 of router 10a, router-down prediction detector 207 instructs pseudo-KEEPALIVE message generator 208 or proxy response message generator 209 to generate and send a message based on the router-down prediction information.

When instructed to generate and send a message by router-down prediction detector 207, pseudo-KEEPALIVE message generator 208 generates a pseudo-KEEPALIVE message, which is a pseudo-routing message for pretending that a KEEPALIVE message to be received by a KEEPALIVE message receiving router has been sent from a KEEPALIVE message sending router, in order to prevent the KEEPALIVE message receiving router from detecting a fault due to the KEEPALIVE message being not properly received, and sends the pseudo-KEEPALIVE message to packet sorter 203.

When instructed to generate and send a message by router-down prediction detector 207, proxy response message generator 209 generates a proxy response UPDATE message, which is a pseudo-routing message based on the UPDATE message stored in routing table cache 206, instead of the received UPDATE message, in order not to give a CPU processing load due to a routing table updating process to an UPDATE message destination router, and sends the proxy response UPDATE message to packet sorter 203. Furthermore, when a TCP connection between router 10a and router 10b is cut off, proxy response message generator 209 is instructed by router-down prediction detector 207 to establish a TCP connection and exchanges an OPEN message between router 10a and repeater transmitter 200a, so that they can send and receive a routing message.

Router 10a and repeater transmitter 200a are interconnected by communication line 14 dedicated to the transmission of router-down prediction information.

Operation of repeater transmitter 200a in the communication system thus configured will be described below.

First, a mode of operation in which repeater transmitter 200a has received a KEEPALIVE message sent from router 10b to router 10a beyond a predetermined transmission interval will be described below.

Figure 4:
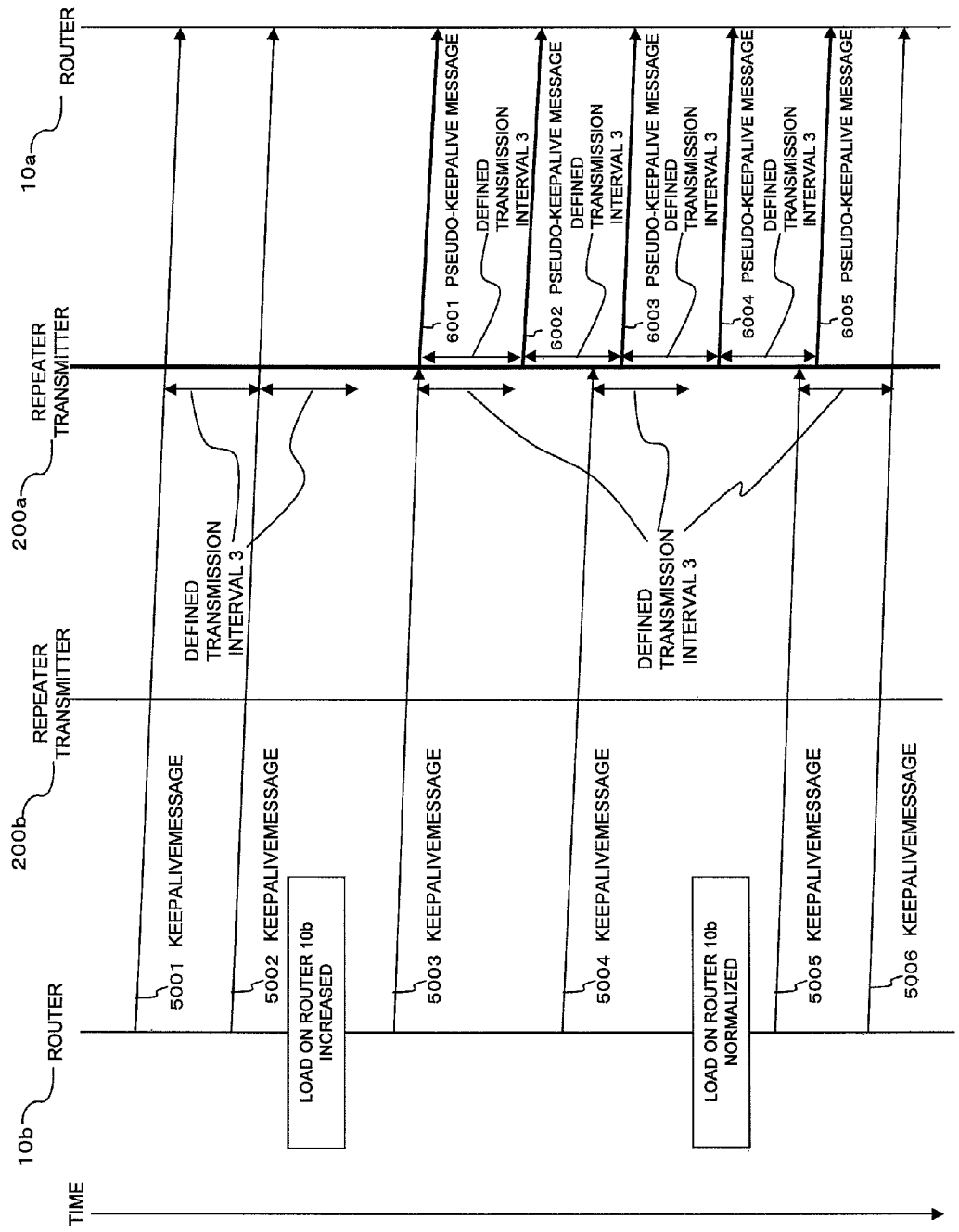
FIG. 4 is a sequence diagram showing an example of the transmission of a KEEPALIVE message between adjacent routers in the communication system shown in FIGS. 2 and 3.

FIG. 4 is a sequence diagram showing an example of the transmission of a KEEPALIVE message from router 10b to router 10a in the communication system shown in FIGS. 2 and 3.

Figure 5:
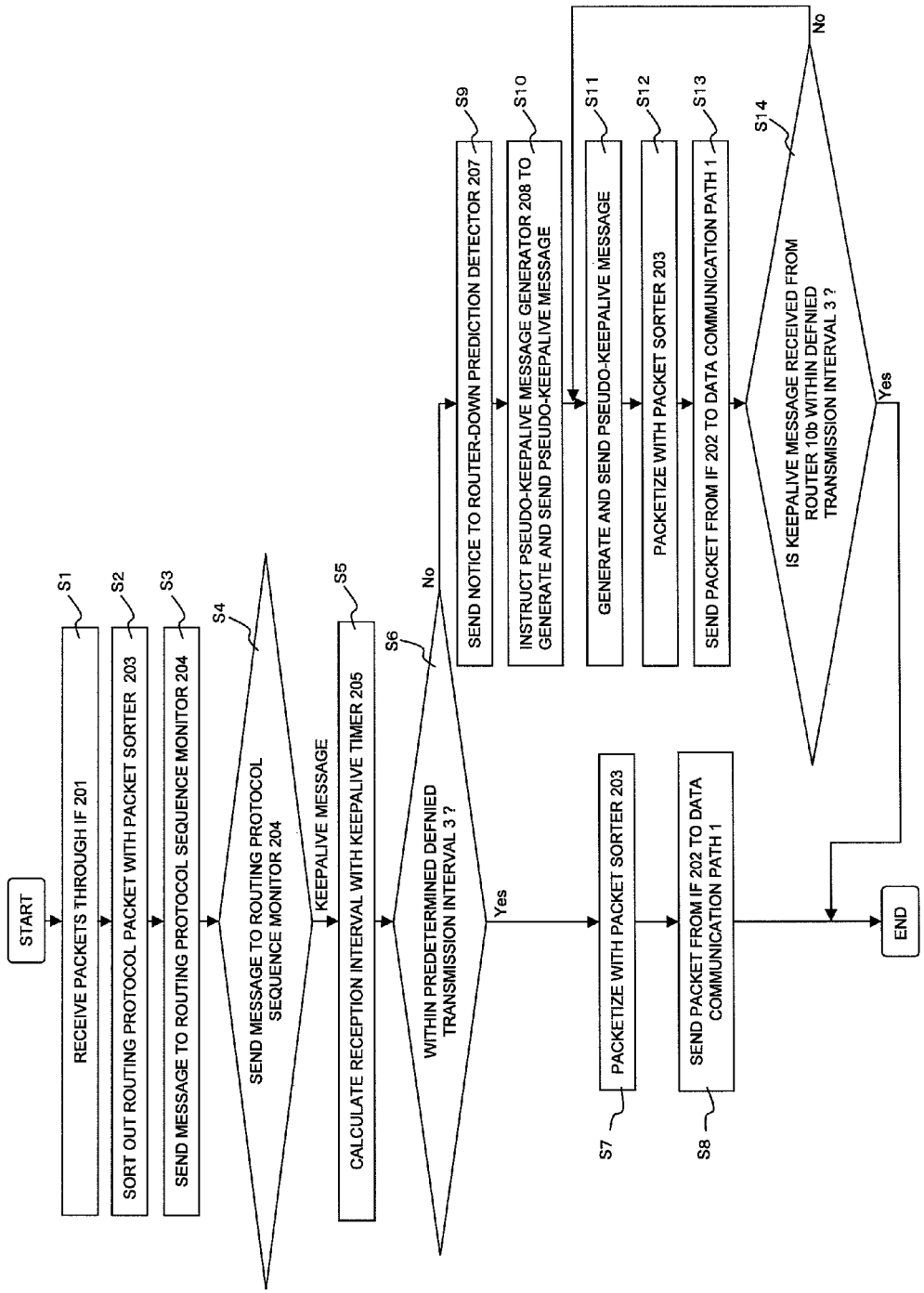
FIG. 5 is a flowchart of an operation sequence of a repeater transmitter when it has received a KEEPALIVE message beyond a defined transmission interval in the communication system shown in FIGS. 2 and 3.

FIG. 5 is a flowchart of an operation sequence of repeater transmitter 200a when the KEEPALIVE message is sent from router 10b to router 10a in the communication system shown in FIGS. 2 and 3.

In step S1, repeater transmitter 200a receives a packet which is sent along transmission path 1 from router 10b through IF 201.

In step S2, packet sorter 203 sorts out the packet into a data packet or a routing protocol packet. Packet sorter 203 does not process the data packet and sends the data packet through IF 202 connected to router 10a to data transmission path 1.

In step S3, packet sorter 203 removes a header from the routing protocol packet, and sends only a routing message thereof to routing protocol sequence monitor 204.

In step S4, routing protocol sequence monitor 204 determines the message type of the received routing message. If the received message is a KEEPALIVE message, then routing protocol sequence monitor 204 sends it to KEEPALIVE timer 205.

In step S5, KEEPALIVE timer 205 calculates the interval between the presently received KEEPALIVE message and the previously received KEEPALIVE message.

In step S6, KEEPALIVE timer 205 determines whether or not the calculated interval is equal to or smaller than predetermined defined transmission interval 3 (e.g., ⅓ of the hold time).

If the interval between previously received KEEPALIVE message 5001 and presently received KEEPALIVE message 5002 is equal to or smaller than defined transmission interval 3, then KEEPALIVE timer 205 returns received KEEPALIVE message 5002 as is to packet sorter 203.

In step S7, packet sorter 203 adds a header to KEEPALIVE message 5002. In step S8, KEEPALIVE message 5002 is sent as a routing protocol packet through IF 202 to data communication path 1.

If the received KEEPALIVE message is KEEPALIVE message 5003 which has arrived at a transmission interval longer than defined transmission interval 3 from the reception of the previous KEEPALIVE message for the reason of an increased processing load on router 10b, then KEEPALIVE timer 205 does not return received KEEPALIVE message 5003 to packet sorter 203.

In step S9, KEEPALIVE timer 205 sends a notice indicating that the transmission interval of the KEEPALIVE message from router 10b has exceeded defined transmission interval 3, to router-down prediction detector 207.

In step S10, upon reception of the notice, router-down prediction detector 207 instructs pseudo-KEEPALIVE message generator 208 to generate a pseudo-KEEPALIVE message for preventing router 10a from detecting the delay in arrival of the KEEPALIVE message and to send the generated pseudo-KEEPALIVE message until a KEEPALIVE message from router 10b is transmitted within defined transmission interval 3.

In step S11, pseudo-KEEPALIVE message generator 208 generates pseudo-KEEPALIVE message 6001 and sends generated pseudo-KEEPALIVE message 6001 to packet sorter 203.

In step S12, packet sorter 203 adds a header to pseudo-KEEPALIVE message 6001, packetizing them. In step S13, the packet including pseudo-KEEPALIVE message 6001 is sent as a routing protocol packet through IF 202 to data communication path 1.

Thereafter, in step S14, the processing from step S11 to step S13 is repeated to send pseudo-KEEPALIVE messages 6002 through 6005 to router 10a until a KEEPALIVE message from router 10b is transmitted within defined transmission interval 3.

When KEEPALIVE message 5006 sent from router 10b within defined transmission interval 3 is received, the transmission of pseudo-KEEPALIVE messages is stopped.

A mode of operation in which repeater transmitter 200a has received an UPDATE message sent from router 10b to router 10a will be described below.

Figure 6:
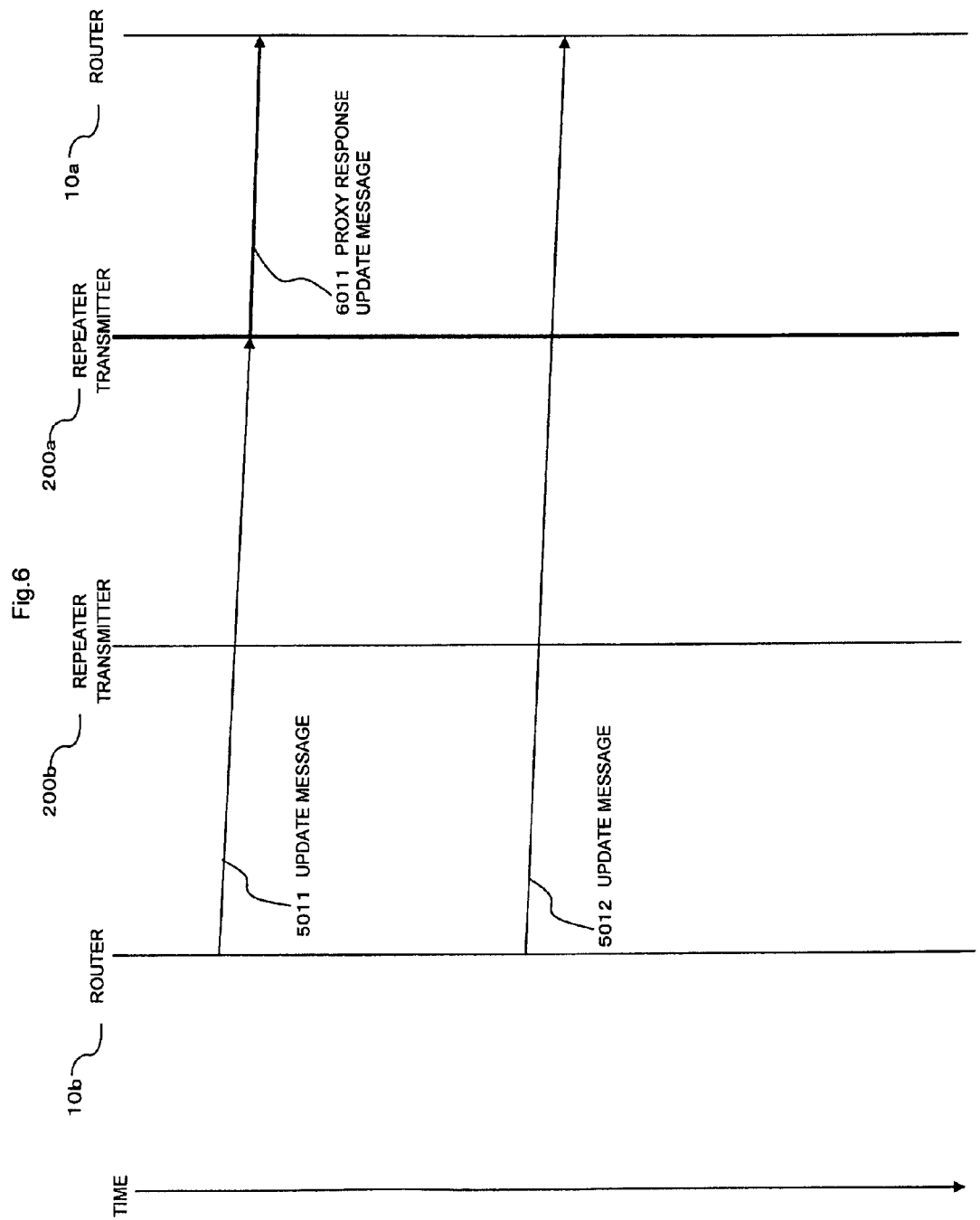
FIG. 6 is a sequence diagram showing an example of the transmission of an UPDATE message between adjacent routers in the communication system shown in FIGS. 2 and 3.
Figure 7:
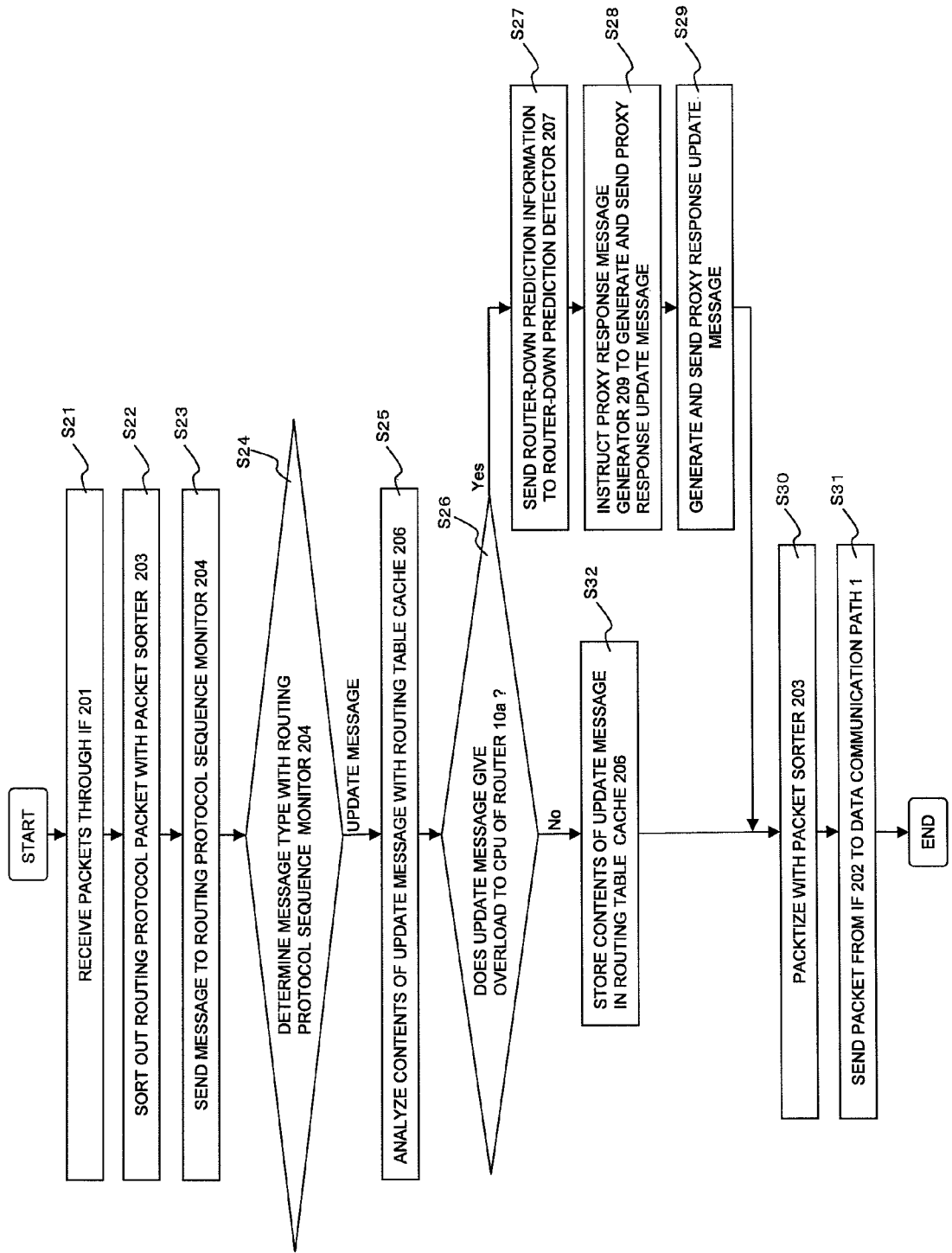
FIG. 7 is a flowchart of an operation sequence of a repeater transmitter when it has received an UPDATE message between adjacent routers in the communication system shown in FIGS. 2 and 3.

FIG. 6 is a sequence diagram showing an example of the transmission of an UPDATE message from router 10b to router 10a in the communication system shown in FIGS. 2 and 3.

FIG. 5 is a flowchart of an operation sequence of repeater transmitter 200a when the UPDATE message is sent from router 10b to router 10a in the communication system shown in FIGS. 2 and 3.

In step S21, repeater transmitter 200a receives a packet which is sent along transmission path 1 from router 10b through IF 201.

In step S22, packet sorter 203 sorts out the packet into a data packet or a routing protocol packet. Packet sorter 203 does not process the data packet and sends the data packet through IF 202 connected to router 10a to data transmission path 1.

In step S23, packet sorter 203 removes a header from the routing protocol packet, and sends only a routing message thereof to routing protocol sequence monitor 204.

In step S24, routing protocol sequence monitor 204 determines the message type of the received routing message. If the received message is an UPDATE message, then routing protocol sequence monitor 204 sends it to routing table cache 206.

In step S25, routing table cache 206 analyzes the contents of the received UPDATE message.

In step S26, routing table cache 206 determines whether the contents of the received UPDATE message are to be sent to router 10a or not.

If routing table cache 206 judges that UPDATE message 5011 sent from router 10b contains more route deletion information and route updating information than the UPDATE message stored in routing table cache 206 because of a fault in a router or a communication path that is disposed upstream of router 10b, and hence also judges that a load imposed due to a routing table updating process in router 10a exceeds the processing capability of the CPU of the router 10a by sending the contents of UPDATE message 5011 to router 10a, then routing table cache 206 does not return received UPDATE message 5011 to packet sorter 203.

In step S27, routing table cache 206 sends received UPDATE message 5011 as well as the stored UPDATE message as router-down prediction information to router-down prediction detector 207.

In step S28, upon reception of the router-down prediction information, router-down prediction detector 207 instructs proxy response message generator 209 to generate and send a proxy response UPDATE message based on the UPDATE message stored in routing table cache 206.

In step S29, proxy response message generator 209 generates proxy response UPDATE message 6011 and sends generated proxy response UPDATE message 6011 to packet sorter 203.

In step S30, packet sorter 203 adds a header to proxy response UPDATE message 6011, packetizing them. In step S31, the packet including proxy response UPDATE message 6011 is sent as a routing protocol packet through IF 202 to data communication path 1.

If routing table cache 206 judges that a load imposed due to a routing table updating process in router 10a does not exceed the processing capability of the CPU of the router 10a by sending the contents of UPDATE message 5012 to router 10a, then routing table cache 206 stores the contents of received UPDATE message 5012 and returns received UPDATE message 5012 as is to packet sorter 203 in step S32.

Then, control goes to step S30 in which packet sorter 203 adds a header to proxy response UPDATE message 5012, packetizing them. In step S31, the packet including proxy response UPDATE message 5012 is sent as a routing protocol packet through IF 202 to data communication path 1.

A mode of operation in which repeater transmitter 200a has not received a KEEPALIVE message sent from router 10b to router 10a within a predetermined defined time will be described below. In this mode of operation, a fault is considered to have occurred in communication path 1 between router 10b or router 10a and repeater transmitter 200a, and a TCP connection between router 10a and router 10b is cut off.

Figure 8:
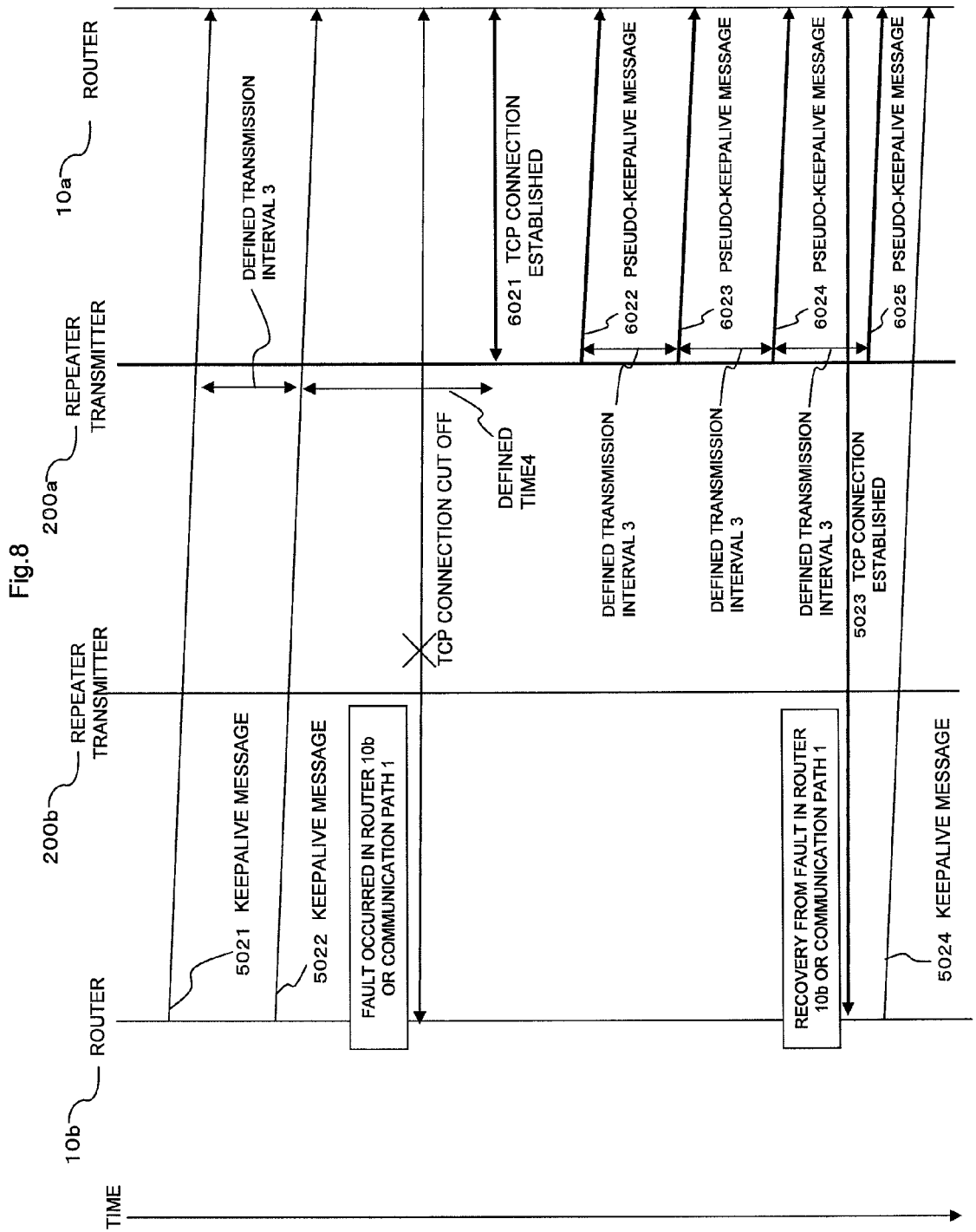
FIG. 8 is a sequence diagram showing an example of the transmission of a KEEPALIVE message between adjacent routers in the communication system shown in FIGS. 2 and 3.

FIG. 8 is a sequence diagram showing an example of the transmission of a KEEPALIVE message from router 10b to router 10a in the communication system shown in FIGS. 2 and 3.

Figure 9:
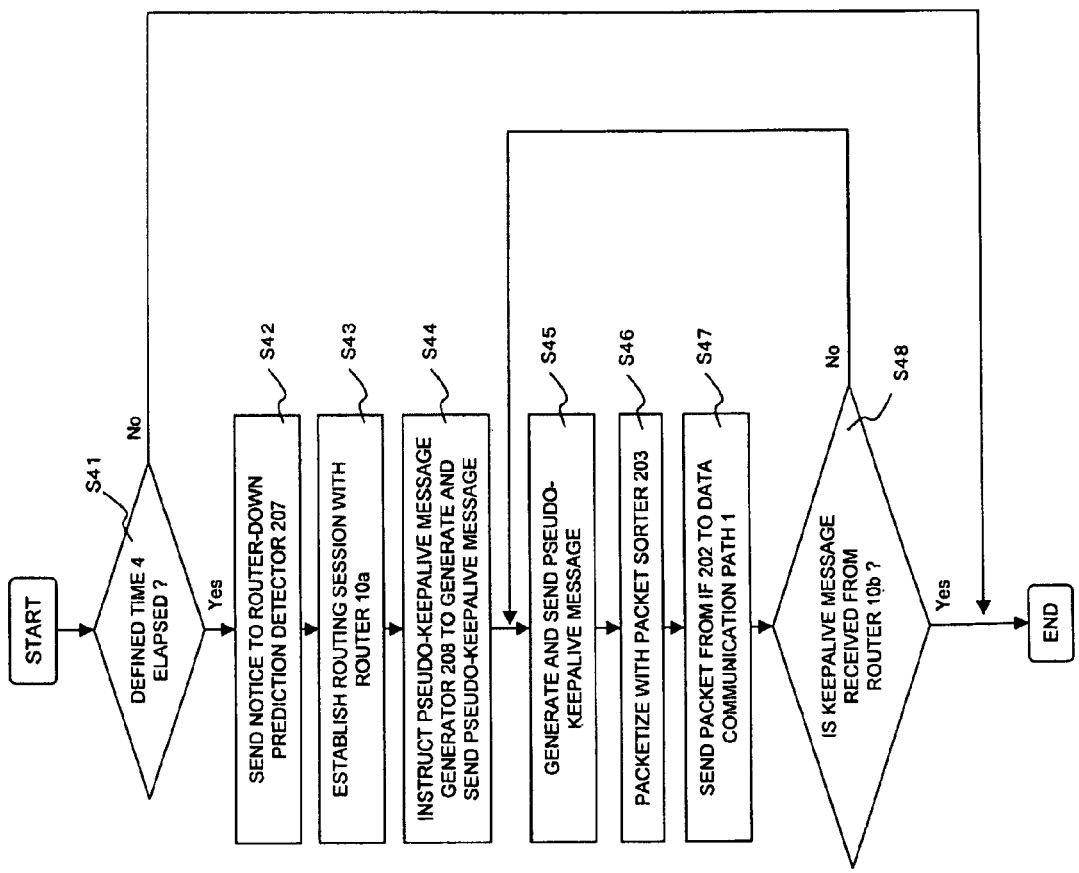
FIG. 9 is a flowchart of an operation sequence of a repeater transmitter when it has not received a KEEPALIVE message within a defined time in the communication system shown in FIGS. 2 and 3.

FIG. 9 is a flowchart of an operation sequence of repeater transmitter 200a when a KEEPALIVE message is sent from router 10b to router 10a in the communication system shown in FIGS. 2 and 3.

KEEPALIVE timer 205 of repeater transmitter 200a measures a period of time that has elapsed from the time KEEPALIVE message 5022 was received. If a next KEEPALIVE message has not arrived from router 10b after elapse of predetermined defined time 4 (e.g., ⅔ of the hold time) in step S41, then KEEPALIVE timer 205 autonomously sends a notice to that effect to router-down prediction detector 207 in step S42.

Upon reception of the notice, router-down prediction detector 207 instructs proxy response message generator 209 to establish TCP connection 6021 with router 10a. After having established the TCP connection, proxy response message generator 209 exchanges an OPEN message with router 10a.

In step S43, a routing session is established between repeater transmitter 200a and router 10a.

In step S44, router-down prediction detector 207 instructs pseudo-KEEPALIVE message generator 208 to generate a pseudo-KEEPALIVE message for preventing router 10a from detecting the occurrence of the fault and to send the generated pseudo-KEEPALIVE message until a next KEEPALIVE message is received from router 10b.

In step S45, pseudo-KEEPALIVE message generator 208 generates pseudo-KEEPALIVE message 6022 and sends generated pseudo-KEEPALIVE message 6022 to packet sorter 203. Rather than exchanging a new OPEN message as described above, the pseudo-KEEPALIVE message may be sent using the routing session which has already been established between router 10a and router 10b.

In step S46, packet sorter 203 adds a header to pseudo-KEEPALIVE message 6022, packetizing them. In step S47, the packet including pseudo-KEEPALIVE message 6022 is sent as a routing protocol packet through IF 202 to data communication path 1.

Thereafter, in step S48, the processing from step S45 to step S47 is repeated to send pseudo-KEEPALIVE messages 6023 through 6025 to router 10a until a KEEPALIVE message from router 10b is received.

Upon recovery from the fault, TCP connection 5023 is established again between router 10a and router 10b, and then KEEPALIVE message 5024 is received from router 10b. The transmission of pseudo-KEEPALIVE messages is now stopped.

A mode of operation in which repeater transmitter 200a has received router-down prediction information from router 10a will be described below. In this mode of operation, router 10a has suffered a hardware failure, a software failure, or an abrupt increase in CPU utilization, and is in a state that makes it difficult to continue its routing protocol process.

Figure 10:
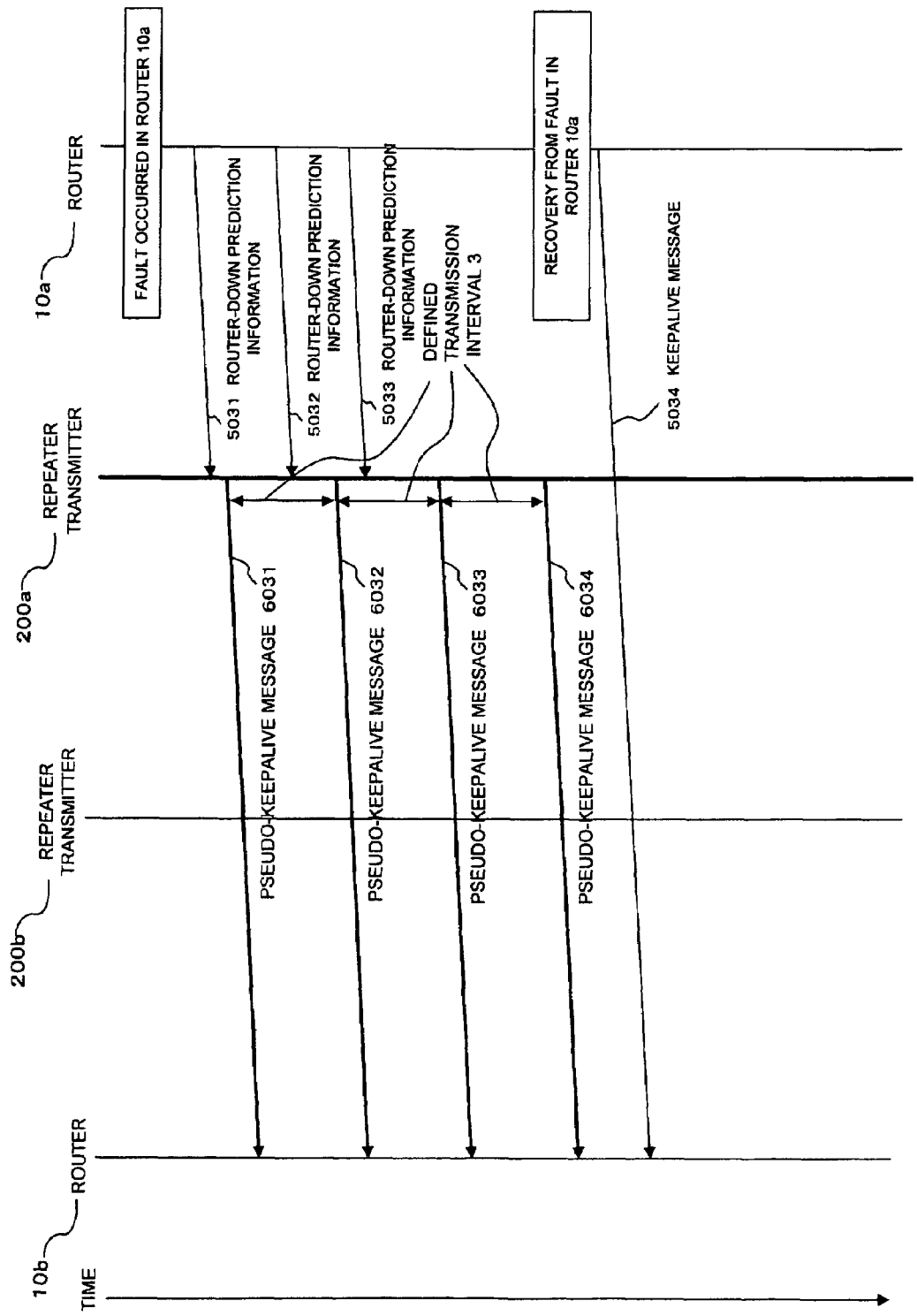
FIG. 10 is a sequence diagram showing an example of the transmission of a KEEPALIVE message between adjacent routers in the communication system shown in FIGS. 2 and 3.

FIG. 10 is a sequence diagram showing an example of the transmission of a KEEPALIVE message from router 10a to router 10b in the communication system shown in FIGS. 2 and 3.

Figure 11:
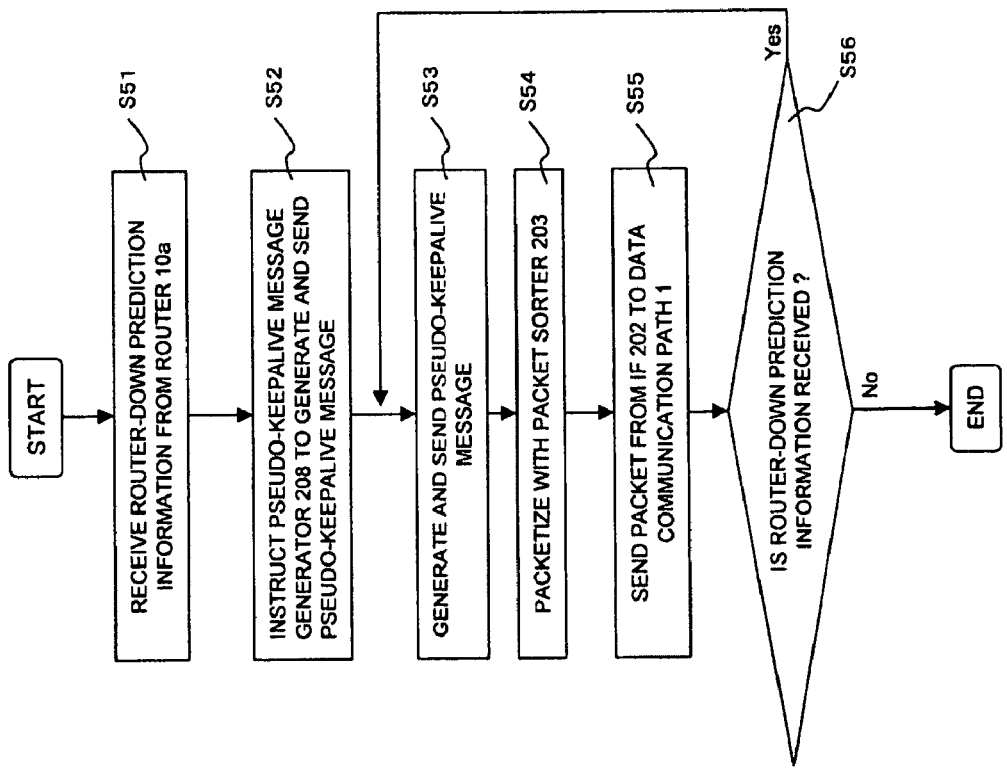
FIG. 11 is a flowchart of an operation sequence of a repeater transmitter when it has received router-down prediction information from a router in the communication system shown in FIGS. 2 and 3.

FIG. 11 is a flowchart of an operation sequence of repeater transmitter 200a when it has received router-down prediction information from router 10a in the communication system shown in FIGS. 2 and 3.

In step S51, router-down prediction detector 207 of repeater transmitter 20a receives router-down prediction information 5031 from router 10a through communication line 14.

In step S52, router-down prediction detector 207 instructs pseudo-KEEPALIVE message generator 208 to generate a pseudo-KEEPALIVE message for preventing router 10b from detecting the occurrence of the fault in router 10a and to send the generated pseudo-KEEPALIVE message at defined transmission interval 3 until no router-down prediction information will be received.

In step S53, pseudo-KEEPALIVE message generator 208 generates pseudo-KEEPALIVE message 6031 and sends generated pseudo-KEEPALIVE message 6031 to packet sorter 203.

In step S54, packet sorter 203 adds a header to pseudo-KEEPALIVE message 6031, packetizing them. In step S55, the packet including pseudo-KEEPALIVE message 6031 is sent as a routing protocol packet through IF 201 to data communication path 1.

Thereafter, in step S56, the processing from step S53 to step S55 is repeated to send pseudo-KEEPALIVE messages 6032 through 6034 to router 10b until no router-down prediction information will be received from router 10a. As long as router-down prediction information is received from router 10a, repeater transmitter 200a does not send an UPDATE message received from router 10b to router 10a, but stores the UPDATE message in routing table cache 206.

When no router-down prediction information is received from router 10a, the transmission of pseudo-KEEPALIVE messages is stopped.

In the present exemplary embodiment, router-down prediction information is sent from router 10a to repeater transmitter 200a through dedicated communication line 14. However, router-down prediction information may be sent from router 10a to repeater transmitter 200a through data communication path 1, and dedicated communication line 14 may be dispensed with.

2nd Exemplary Embodiment

Figure 12:
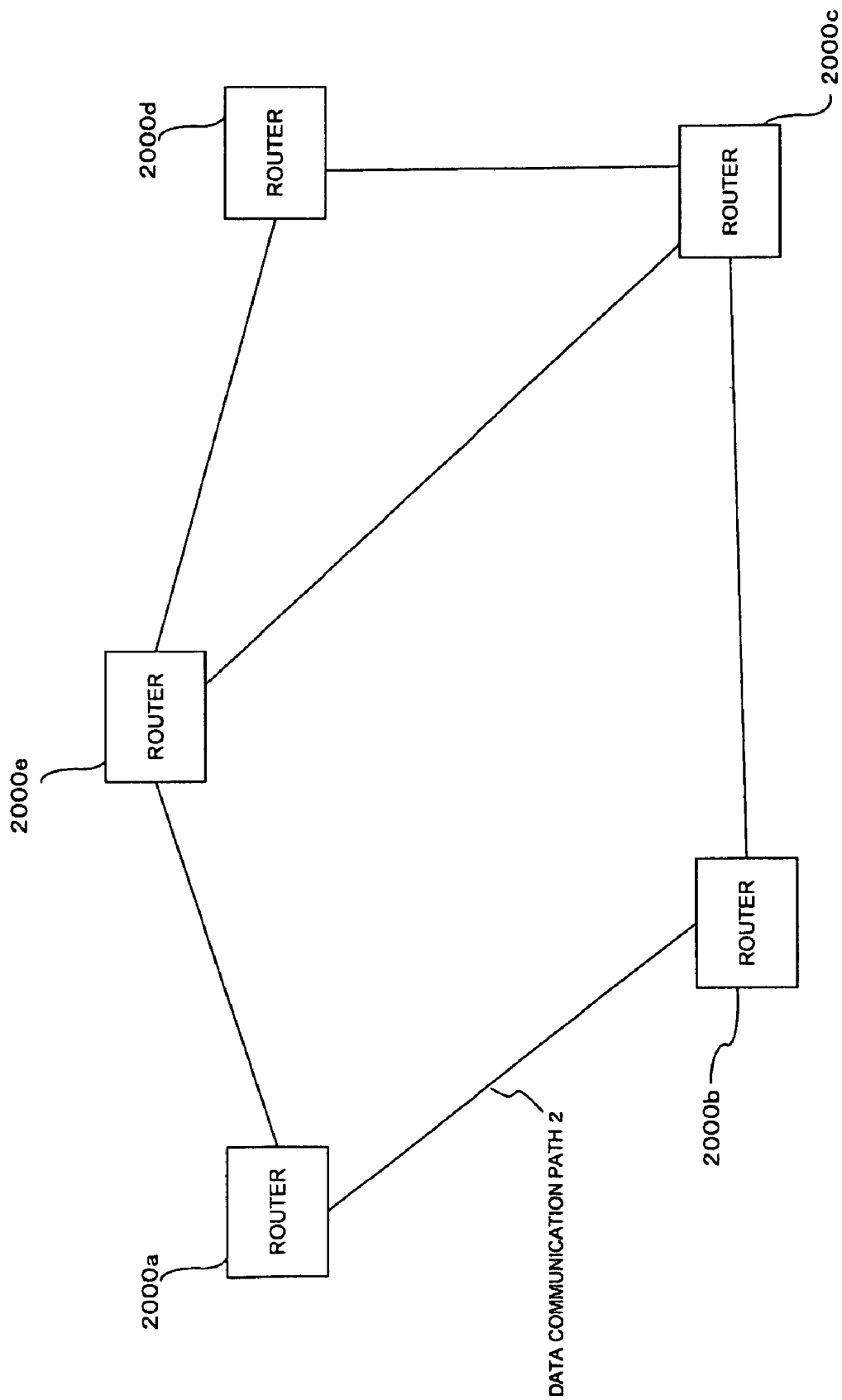
FIG. 12 is a block diagram of a communication system incorporating repeaters according to a second exemplary embodiment of the present invention.

FIG. 12 is a block diagram of a communication system incorporating repeaters according to a second exemplary embodiment of the present invention.

As shown in FIG. 12, the communication system according to the second exemplary embodiment comprises routers 2000a through 2000e serving as repeaters which are interconnected by data communication path 2.

Figure 13:
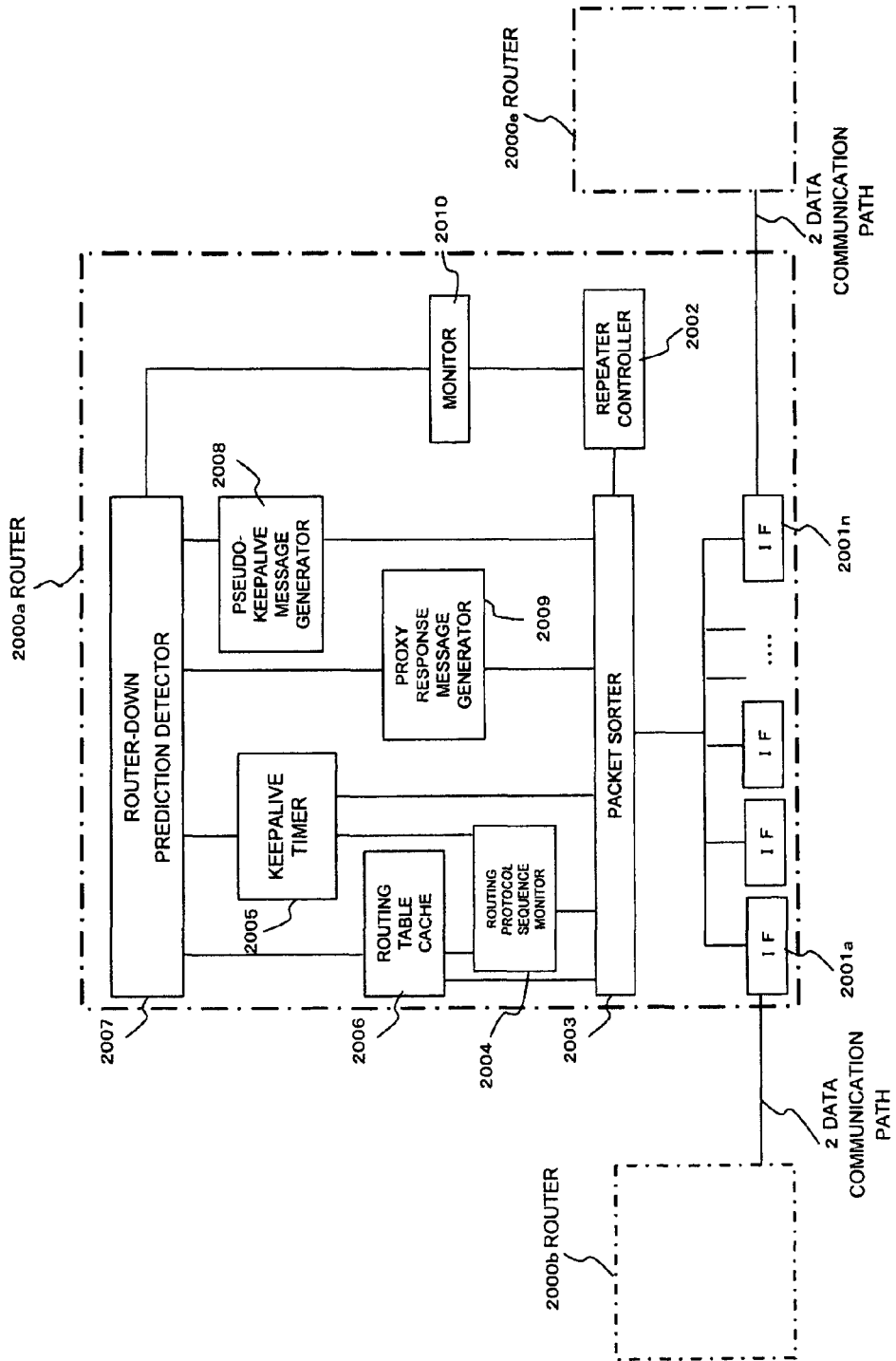
FIG. 13 is a block diagram illustrative of the functions of a router in the communication system shown in FIG. 12.

FIG. 13 is a block diagram illustrative of the functions of router 2000a in the communication system shown in FIG. 12. Other routers 2000b through 2000e shown in FIG. 12 are identical in configuration to router 2000a.

As shown in FIG. 13, router 2000a comprises a plurality of IFs (interfaces) 2001a through 2001n, repeater controller 2002, packet sorter 203 as a repeating device, routing protocol sequence monitor 2004, KEEPALIVE timer 2005 as a repeating suppressor, routing table cache 2006 as a repeating suppressor and a storage, router-down prediction detector 2007 as a fault information receiver, pseudo-KEEPALIVE message generator 2008 as proxy responder, proxy response message generator 2009 as proxy responder, and monitor 2010.

IFs 2001a through 2001n receive a packet from data communication path 2 and sends the packet to repeater controller 2003. IFs 2001a through 2001n receive a packet from packet sorter 2003 and sends the packet to data communication path 2.

Repeater controller 2002 receives a packet from packet sorter 203, refers to a routing table with respect to the received packet, and sends the packet to either one of IFs 2001a through 2001n depending on the destination address from the routing table. Repeater controller 2002 also generates a routing message according to the routing protocol and sends the routing message to packet sorter 2003.

Packet sorter 2003 sorts out a packet received from via either one of IFs 2001a through 2001n into a data packet or a routing protocol packet. Packet sorter 2003 removes a header from the routing protocol packet, and sends only a routing message thereof to routing protocol sequence monitor 2004. Packet sorter 2003 does not process the data packet and returns the data packet as is to repeater controller 2002. When sending the routing message, packet sorter 2003 adds a header to the routing message, and sends them as a routing protocol packet to either one of IFs 2001a through 2001n depending on the destination address.

Routing protocol sequence monitor 2004 determines the message type of the routing message received from packet sorter 2003. If the received message is a KEEPALIVE message, then routing protocol sequence monitor 2004 sends it to KEEPALIVE timer 2005. If the received message is an UPDATE message, then routing protocol sequence monitor 2004 sends it to routing table cache 2006.

KEEPALIVE timer 2005 manages the reception time of the KEEPALIVE message, and confirms if repeater controller 2002 has sent the KEEPALIVE message to an adjacent router in a predetermined defined transmission interval or not. If repeater controller 2002 has not sent the KEEPALIVE message in the predetermined defined transmission interval, then KEEPALIVE timer 2005 sends router-down prediction information to that effect to router-down prediction detector 2007. If repeater controller 2002 has not sent the KEEPALIVE message after elapse of a predetermined defined time from a previously sent KEEPALIVE message, then KEEPALIVE timer 2005 autonomously sends router-down prediction information to that effect to router-down prediction detector 2007.

Routing table cache 2006 stores an UPDATE message sent and received between adjacent routers. Routing table cache 2006 compares the contents of the stored UPDATE message with route deletion information field 52 (see FIG. 1), attribute information field 53 (see FIG. 1), and route updating information field 54 (see FIG. 1) contained in the UPDATE message received from routing protocol sequence monitor 2004, and analyzes them. Routing table cache 2006 determines whether a load imposed due to a routing table updating process in an adjacent router by sending the contents of the received UPDATE message to the adjacent router exceeds the processing capability of the CPU of the adjacent router or not. If routing table cache 2006 judges that the load imposed by sending the contents of the received UPDATE message does not exceed the processing capability of the CPU of the adjacent router, then routing table cache 2006 stores the received UPDATE message and returns the UPDATE message as is to packet sorter 2003.

Conversely, if routing table cache 2006 judges that the load imposed by sending the contents of the received UPDATE message exceeds the processing capability of the CPU of the adjacent router, then routing table cache 2006 sends router-down prediction information to that effect to router-down prediction detector 2007. Routing table cache 2006 also sends the stored UPDATE message to router-down prediction detector 2007.

When router-down prediction detector 2007 receives router-down prediction information from KEEPALIVE timer 2005, routing table cache 2006, or monitor 2010, router-down prediction detector 2007 instructs pseudo-KEEPALIVE message generator 2008 or proxy response message generator 2009 to generate and send a message based on the router-down prediction information.

When instructed to generate and send a message by router-down prediction detector 2007, pseudo-KEEPALIVE message generator 2008 generates a pseudo-KEEPALIVE message, which is a pseudo-routing message for pretending that a KEEPALIVE message to be received by a KEEPALIVE message receiving router has been sent from a KEEPALIVE message sending router, in order to prevent the KEEPALIVE message receiving router from detecting a fault due to the KEEPALIVE message being not properly received, and sends the pseudo-KEEPALIVE message to packet sorter 2003.

When instructed to generate and send a message by router-down prediction detector 2007, proxy response message generator 2009 generates a proxy response UPDATE message, which is a pseudo-routing message based on the UPDATE message stored in routing table cache 2006, instead of the received UPDATE message, in order not to give a CPU processing load due to a routing table updating process to an UPDATE message destination router, and sends the proxy response UPDATE message to packet sorter 2003. Furthermore, when a TCP connection between router 2000b as a first adjacent router and router 2000e as a second adjacent router is cut off, proxy response message generator 2009 is instructed by router-down prediction detector 2007 to establish a TCP connection and exchanges an OPEN message between router 2000a and router 2000b or router 2000e, so that they can send and receive a routing message.

Monitor 2010 monitors the manner in which the hardware and software of router 2000a operate. If router 2000a is about to suffer a fault tending to cause router 2000a to break down, then monitor 2010 sends router-down prediction information to that effect to router-down prediction detector 2007.

Operation of router 2000a in the communication system thus configured will be described below.

First, a mode of operation in which router 2000a does not send a KEEPALIVE message to router 2000b as a first adjacent router in a predetermined transmission interval will be described below.

Figure 14:
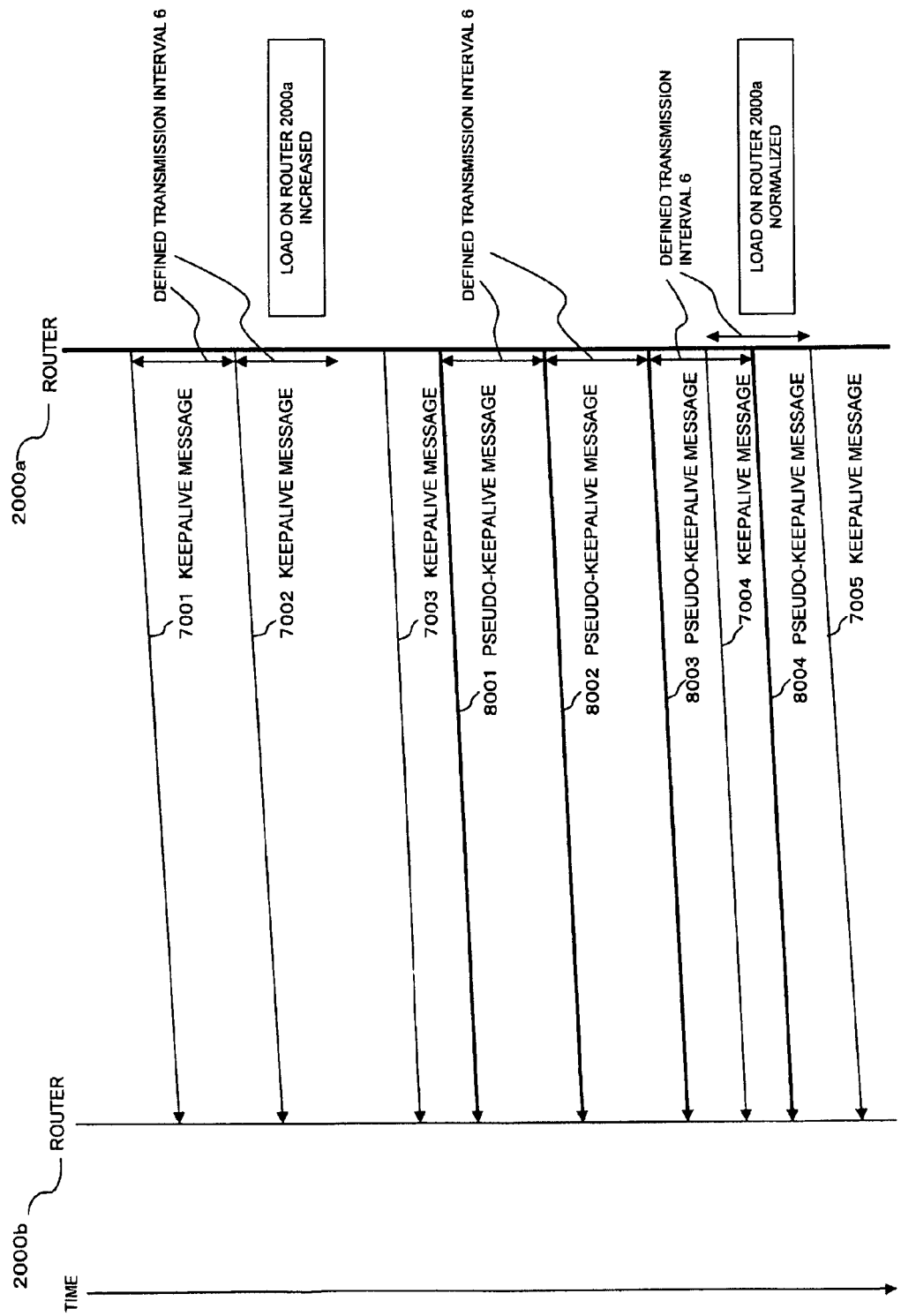
FIG. 14 is a sequence diagram showing an example of the transmission of a KEEPALIVE message between adjacent routers in the communication system shown in FIGS. 12 and 13.

FIG. 14 is a sequence diagram showing an example of the transmission of a KEEPALIVE message from router 2000a to router 2000b in the communication system shown in FIGS. 12 and 13.

Figure 15:
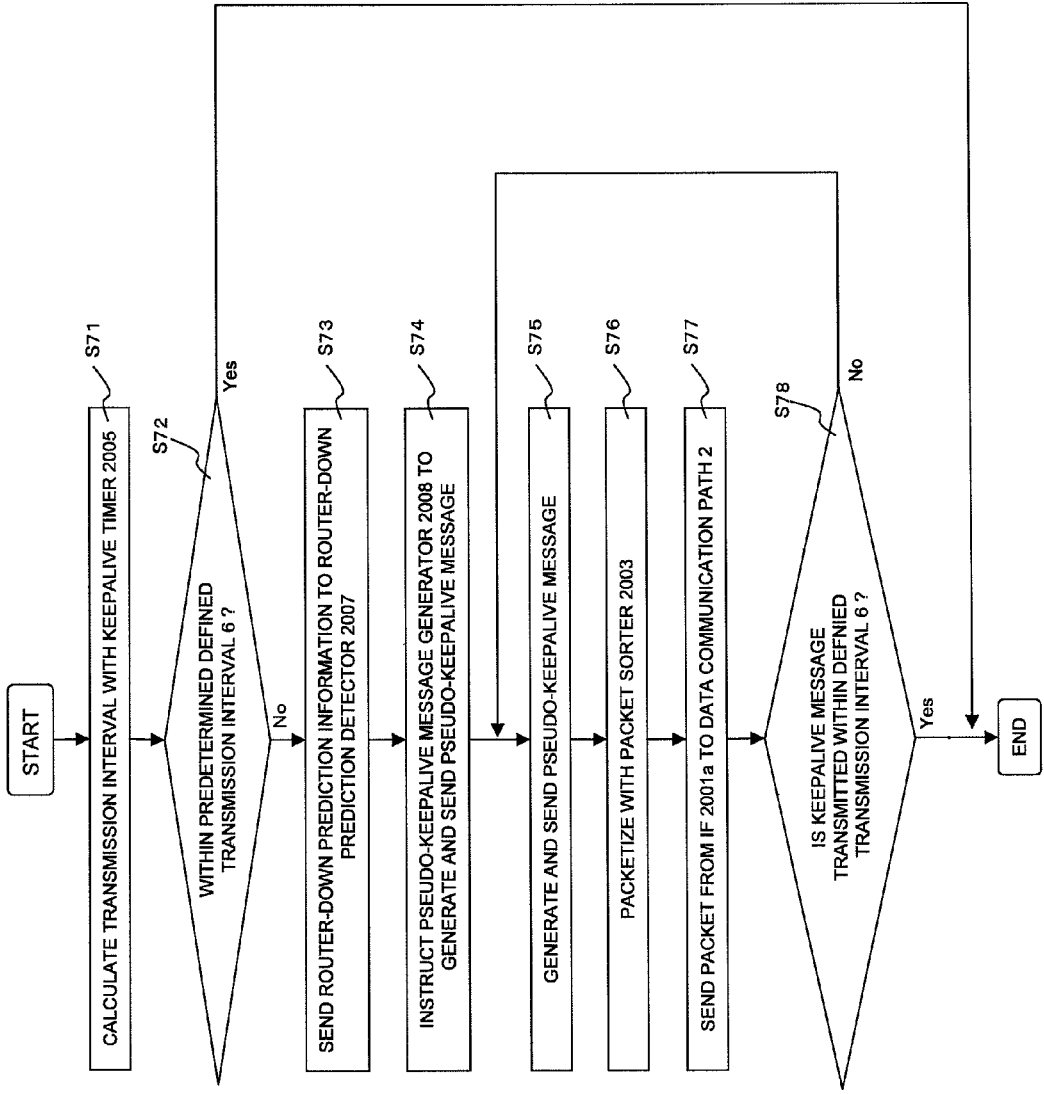
FIG. 15 is a flowchart of an operation sequence of a router when it has not transmitted a KEEPALIVE message in a defined transmission interval in the communication system shown in FIGS. 12 and 13.

FIG. 15 is a flowchart of an operation sequence of router 2000a when the KEEPALIVE message is sent from router 2000a to router 2000b in the communication system shown in FIGS. 12 and 13.

In step S71, KEEPALIVE timer 2005 of router 2000a calculates the interval between presently sent KEEPALIVE message 7002 and previously sent KEEPALIVE message 7001.

In step S72, KEEPALIVE timer 2005 determines whether or not the calculated interval is equal to or smaller than predetermined defined transmission interval 6 (e.g., ⅓ of the hold time).

If the interval between previously sent KEEPALIVE message 7001 and presently sent KEEPALIVE message 7002 is equal to or smaller than defined transmission interval 6, then KEEPALIVE timer 2005 finishes the operation sequence.

If next KEEPALIVE message 7003 is sent at a transmission interval longer than defined transmission interval 6 from previously sent KEEPALIVE message 7002 for the reason of an increased processing load on router 2000b, then KEEPALIVE timer 2005 sends a notice indicating that the transmission interval of the KEEPALIVE message from repeater controller 2002 has exceeded defined transmission interval 6, as router-down prediction information to router-down prediction detector 2007 in step S73.

In step S74, upon reception of the notice, router-down prediction detector 2007 instructs pseudo-KEEPALIVE message generator 2008 to generate a pseudo-KEEPALIVE message for preventing router 200b from detecting the occurrence of a fault in router 2000a and to send the generated pseudo-KEEPALIVE message until a KEEPALIVE message from repeater controller 2002 is transmitted within defined transmission interval 6.

In step S75, pseudo-KEEPALIVE message generator 2008 generates pseudo-KEEPALIVE message 8001 and sends generated pseudo-KEEPALIVE message 8001 to packet sorter 2003.

In step S76, packet sorter 2003 adds a header to pseudo-KEEPALIVE message 8001, packetizing them. In step S77, the packet including pseudo-KEEPALIVE message 8001 is sent as a routing protocol packet through IF 2001a to data communication path 2.

Thereafter, in step S78, the processing from step S75 to step S77 is repeated to send pseudo-KEEPALIVE messages 8002 through 8004 to router 2000b until a KEEPALIVE message from repeater controller 2002 is transmitted within defined transmission interval 6.

When KEEPALIVE message 7005 is sent from repeater controller 2002 within defined transmission interval 6, the transmission of pseudo-KEEPALIVE messages is stopped.

A mode of operation in which router 2000a has received an UPDATE message sent from router 2000b will be described below.

Figure 16:
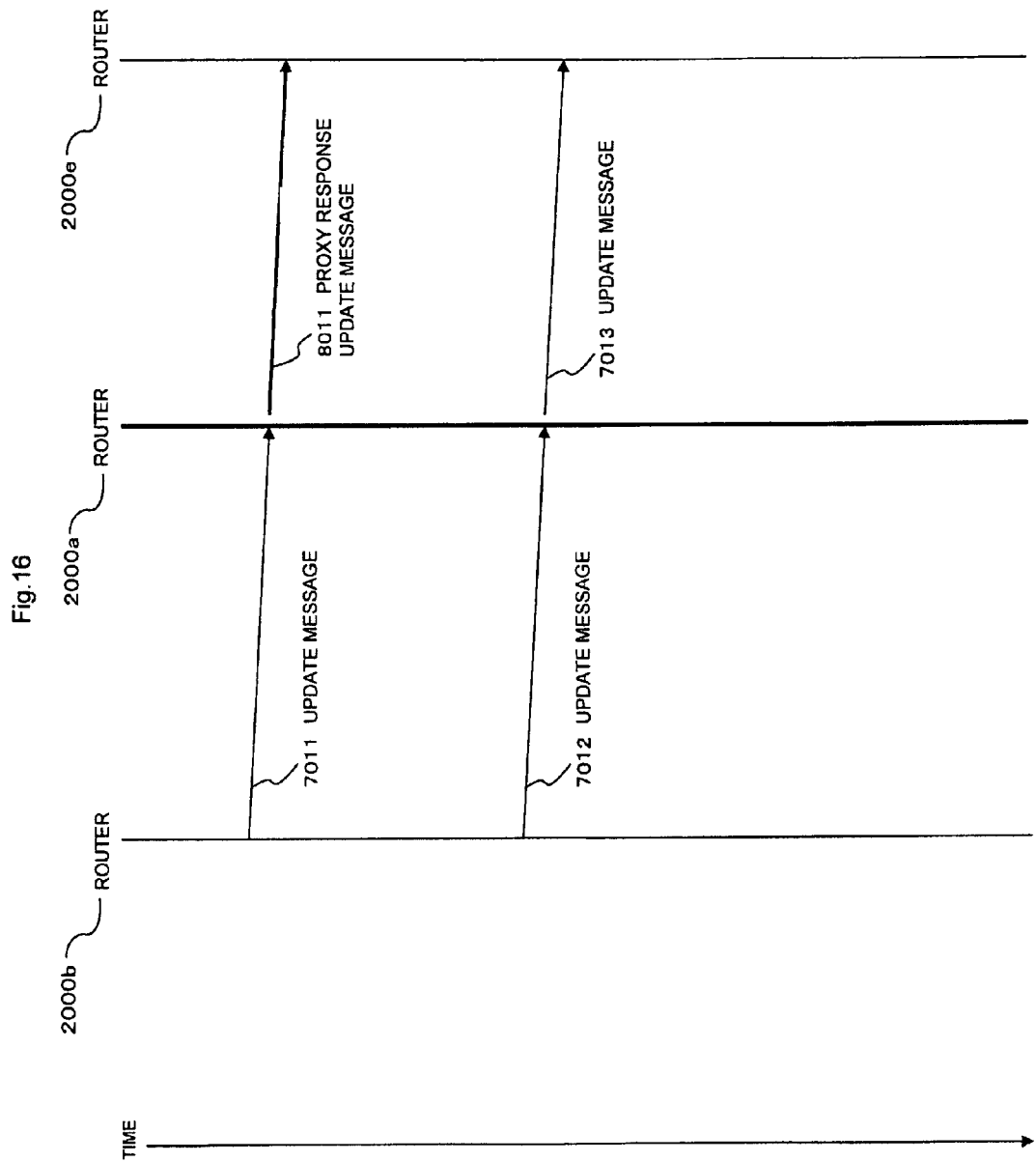
FIG. 16 is a sequence diagram showing an example of the transmission of an UPDATE message between adjacent routers in the communication system shown in FIGS. 12 and 13.

FIG. 16 is a sequence diagram showing an example of the transmission of an UPDATE message from router 2000b to router 2000a and from router 2000a to router 2000e as a second adjacent router in the communication system shown in FIGS. 12 and 13.

Figure 17:
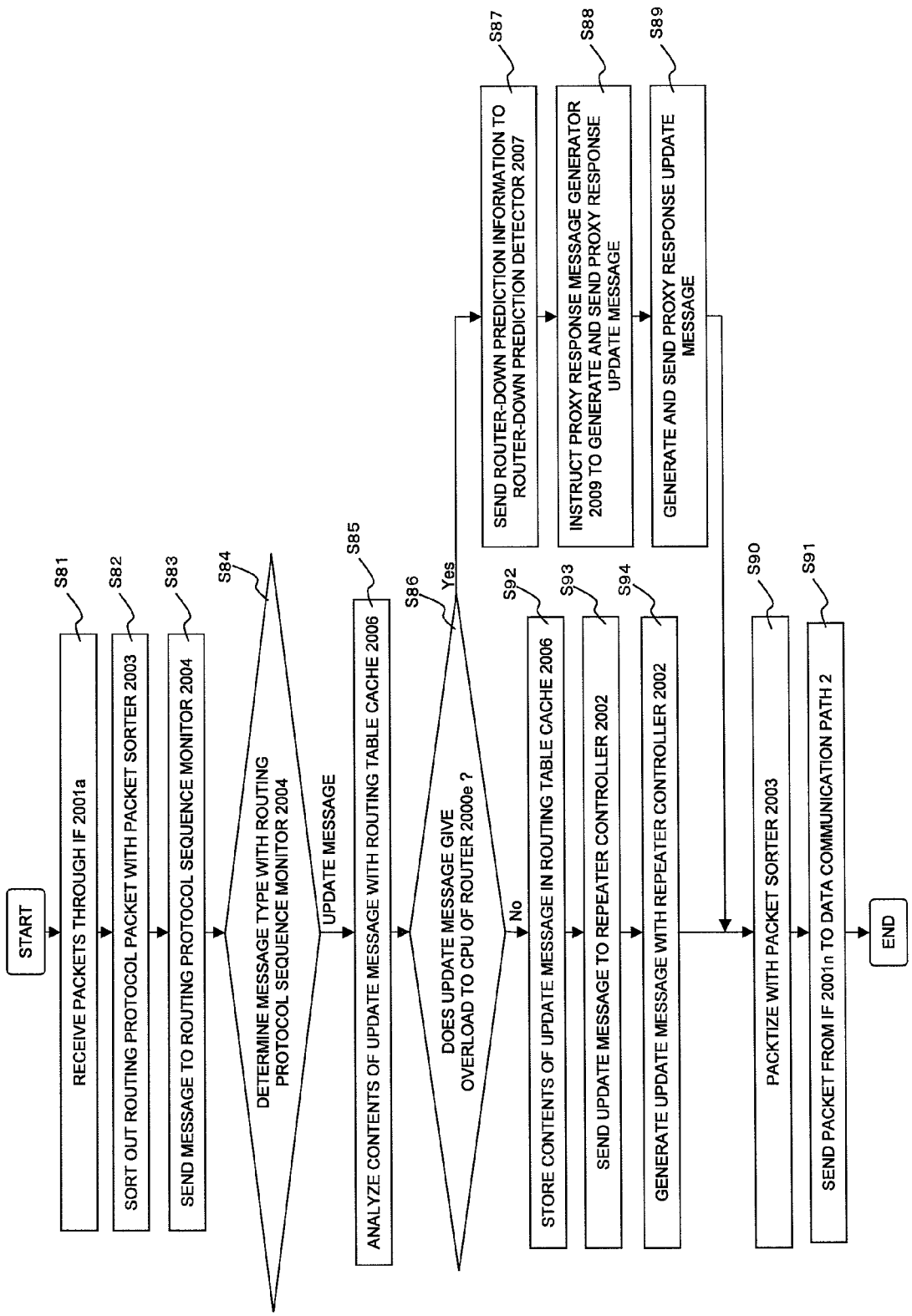
FIG. 17 is a flowchart of an operation sequence of a router when it has received an UPDATE message in the communication system shown in FIGS. 12 and 13.

FIG. 17 is a flowchart of an operation sequence of router 2000a when it has received an UPDATE message sent from router 2000b in the communication system shown in FIGS. 12 and 13.

In step S81, router 2000a receives a packet which is sent along transmission path 2 from router 2000b through IF 2001a.

In step S82, packet sorter 2003 sorts out the packet into a data packet or a routing protocol packet. Packet sorter 2003 does not process the data packet and sends the data packet to repeater controller 2002.

In step S83, packet sorter 2003 removes a header from the routing protocol packet, and sends only a routing message thereof to routing protocol sequence monitor 2004.

In step S84, routing protocol sequence monitor 2004 determines the message type of the routing message received from packet sorter 2003. If the received message is an UPDATE message, then routing protocol sequence monitor 2004 sends it to routing table cache 2006.

In step S85, routing table cache 2006 analyzes the contents of the received UPDATE message.

In step S86, routing table cache 2006 determines whether the contents of the received UPDATE message are to be sent to router 2000e or not.

If routing table cache 2006 judges that UPDATE message 7011 sent from router 200b contains more route deletion information and route updating information than the UPDATE message stored in routing table cache 2006 because of a fault in a router or a communication path that is disposed upstream of router 2000b, and hence also judges that a load imposed due to a routing table updating process in router 2000e exceeds the processing capability of the CPU of the router 2000e by sending the contents of UPDATE message 7011 to router 2000e, then routing table cache 2006 does not return received UPDATE message 7011 to packet sorter 2003.

In step S87, routing table cache 2006 sends received UPDATE message 7011 as well as the stored UPDATE message as router-down prediction information to router-down prediction detector 2007.

In step S88, upon reception of the router-down prediction information, router-down prediction detector 2007 instructs proxy response message generator 2009 to generate and send a proxy response UPDATE message based on the UPDATE message stored in routing table cache 2006.

In step S89, proxy response message generator 2009 generates proxy response UPDATE message 8011 and sends generated proxy response UPDATE message 8011 to packet sorter 2003.

In step S90, packet sorter 2003 adds a header to proxy response UPDATE message 8011, packetizing them. In step S91, the packet including proxy response UPDATE message 8011 is sent as a routing protocol packet through IF 2001n to data communication path 2.

If routing table cache 2006 judges that a load imposed due to a routing table updating process in router 2000e does not exceed the processing capability of the CPU of the router 2000e by sending the contents of UPDATE message 7012 to router 2000e, then routing table cache 2006 stores the contents of received UPDATE message 7012 and returns received UPDATE message 7012 as is to packet sorter 2003 in step S92.

In step S93, UPDATE message 7012 is sent from packet sorter 2003 to repeater controller 2002.

In step S94, repeater controller 2002 generates UPDATE message 7013 for indicating routing information to router 2000e based on UPDATE message 7012. Then, control goes to step S90 in which packet sorter 2003 adds a header to UPDATE message 7013, packetizing them. In step S91, the packet including UPDATE message 7013 is sent as a routing protocol packet through IF 2001n to data communication path 2.

A mode of operation in which router 2000a has not sent a KEEPALIVE message within a predetermined defined time will be described below. In this mode of operation, a fault is considered to have occurred in repeater controller 2002 of router 2000a, and a TCP connection between router 2000a and router 2000b is cut off.

Figure 18:
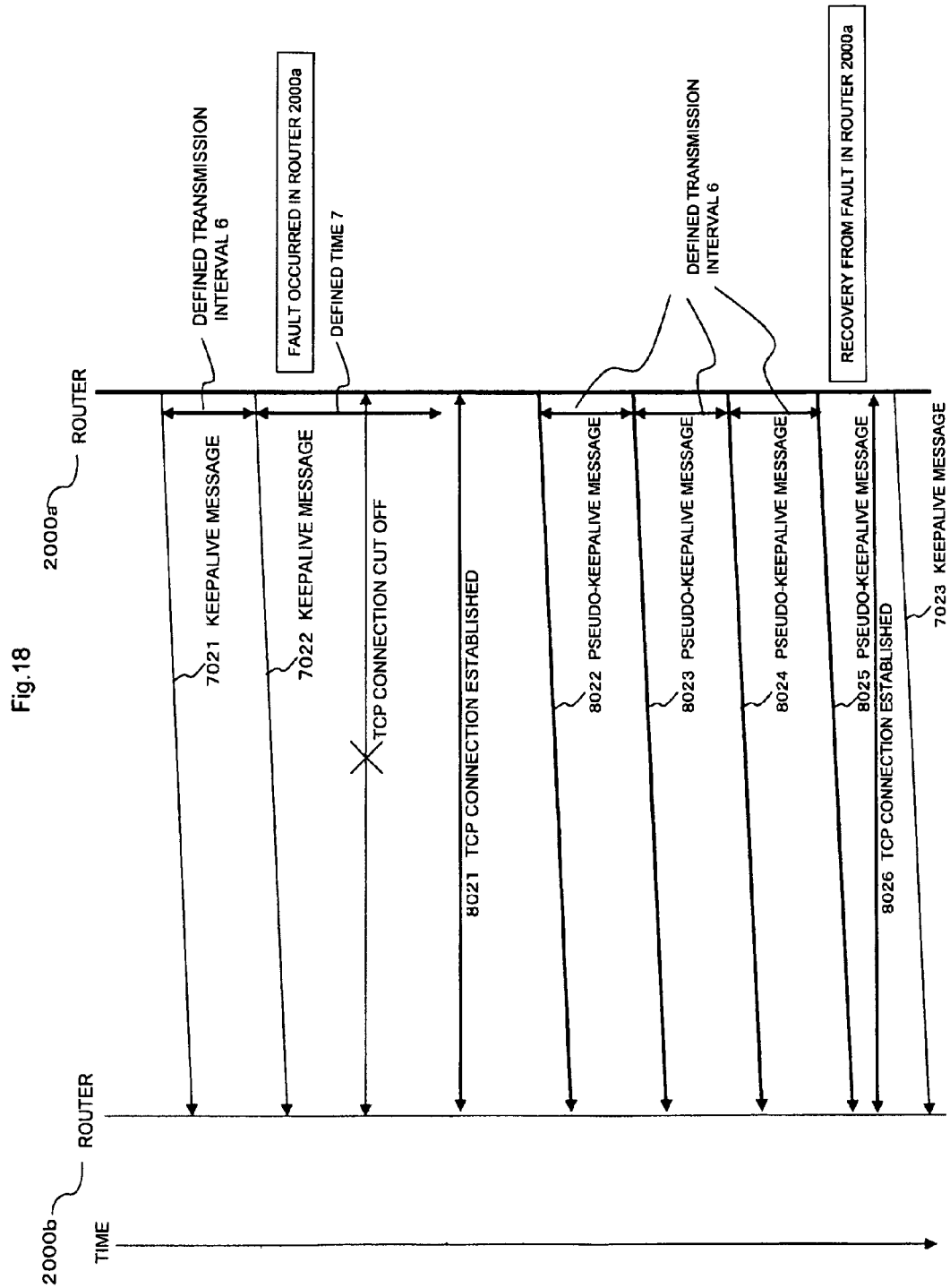
FIG. 18 is a sequence diagram showing an example of the transmission of a KEEPALIVE message between adjacent routers in the communication system shown in FIGS. 12 and 13.

FIG. 18 is a sequence diagram showing an example of the transmission of a KEEPALIVE message from router 2000a to router 2000b in the communication system shown in FIGS. 12 and 13.

Figure 19:
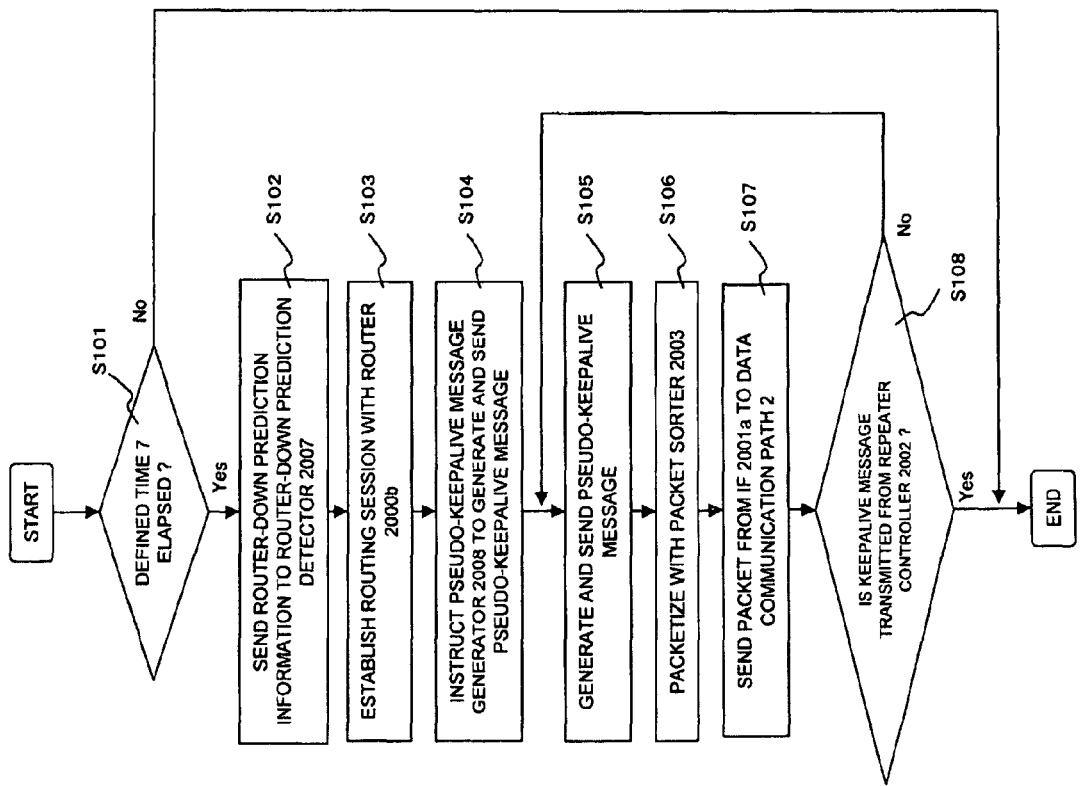
FIG. 19 is a flowchart of an operation sequence of a router when it has not transmitted a KEEPALIVE message within a defined time in the communication system shown in FIGS. 12 and 13.

FIG. 19 is a flowchart of an operation sequence of router 2000a when a KEEPALIVE message is sent from router 2000a to router 2000b in the communication system shown in FIGS. 12 and 13.

KEEPALIVE timer 2005 of router 2000a measures a period of time that has elapsed from the time KEEPALIVE message 7022 was previously sent from repeater controller 2002. If repeater controller 2002 has not sent a next KEEPALIVE message after elapse of predetermined defined time 7 (e.g., ⅔ of the hold time) in step S101, then KEEPALIVE timer 2005 autonomously sends router-down prediction information to that effect to router-down prediction detector 2007 in step S102.

Upon reception of the router-down prediction information, router-down prediction detector 2007 instructs proxy response message generator 2009 to establish TCP connection 8021 with router 2000b. After having established the TCP connection, proxy response message generator 2009 exchanges an OPEN message with router 2000b.

In step S103, a routing session is established between router 2000a and router 2000b.

In step S104, router-down prediction detector 2007 instructs pseudo-KEEPALIVE message generator 2008 to generate a pseudo-KEEPALIVE message for preventing router 2000b from detecting the occurrence of the fault of router 2000a and to send the generated pseudo-KEEPALIVE message until repeater controller 2002 sends a next KEEPALIVE message.

In step S105, pseudo-KEEPALIVE message generator 2008 generates pseudo-KEEPALIVE message 8022 and sends generated pseudo-KEEPALIVE message 8022 to packet sorter 2003. In step S106, packet sorter 2003 adds a header to pseudo-KEEPALIVE message 8022, packetizing them. In step S107, the packet including pseudo-KEEPALIVE message 8022 is sent as a routing protocol packet through IF 2001a to data communication path 2.

Thereafter, in step S108, the processing from step S105 to step S107 is repeated to send pseudo-KEEPALIVE messages 8023 through 8025 to router 2000b until a KEEPALIVE message is sent from repeater controller 2002.

Upon recovery from the fault of repeater controller 2002, repeater controller 2002 establishes TCP connection 8026 with router 2000b, and sends KEEPALIVE message 7023. The transmission of pseudo-KEEPALIVE messages is now stopped.

A mode of operation in which router-down prediction detector 2007 has received router-down prediction information from monitor 2010 will be described below. In this mode of operation, router 2000a has suffered a hardware failure, a software failure, or an abrupt increase in CPU utilization, and is in a state that makes it difficult to continue its routing protocol process.

Figure 20:
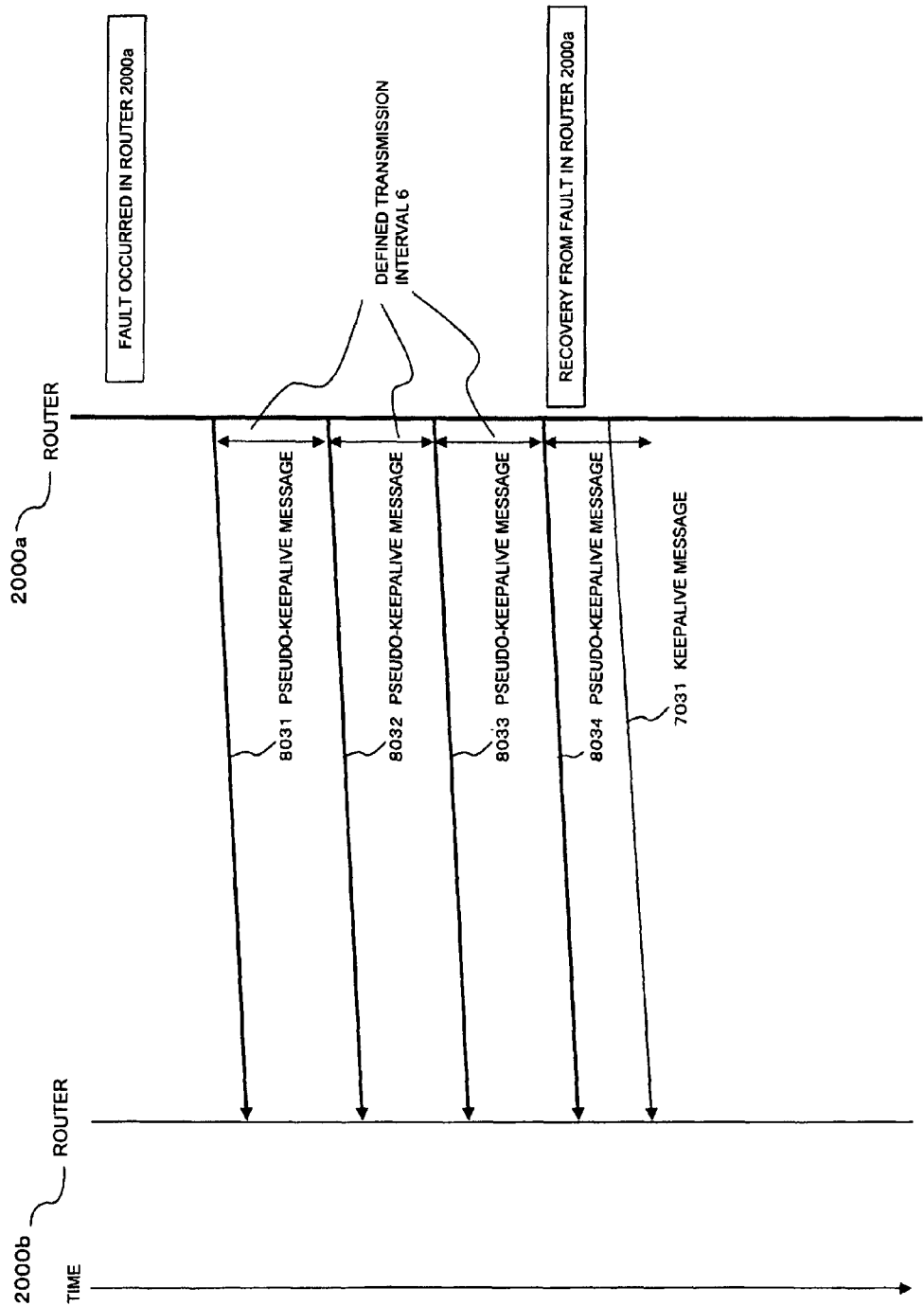
FIG. 20 is a sequence diagram showing an example of the transmission of a KEEPALIVE message between adjacent routers in the communication system shown in FIGS. 12 and 13.

FIG. 20 is a sequence diagram showing an example of the transmission of a KEEPALIVE message from router 2000a to router 2000b in the communication system shown in FIGS. 12 and 13.

Figure 21:
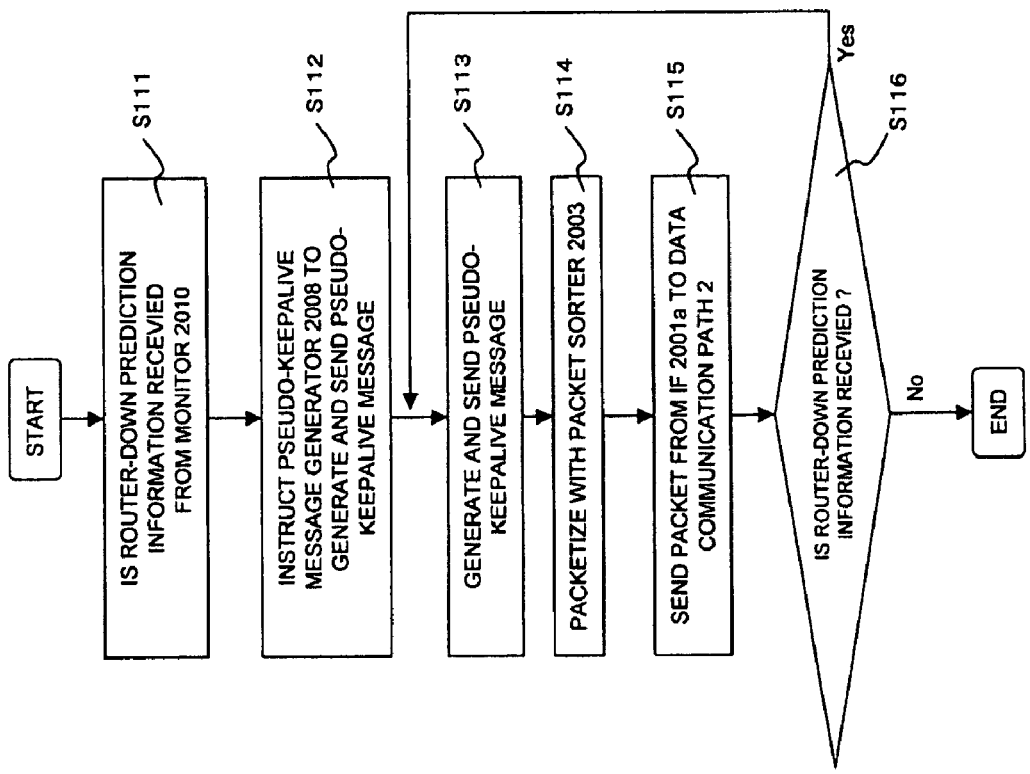
FIG. 21 is a flowchart of an operation sequence of a router when it has detected router-down prediction information therein in the communication system shown in FIGS. 12 and 13.

FIG. 21 is a flowchart of an operation sequence of router 2000a when monitor 2010 thereof has received router-down prediction information in the communication system shown in FIGS. 12 and 13.

In step S111, router-down prediction detector 2007 receives router-down prediction information from monitor 2010.

In step S112, router-down prediction detector 2007 instructs pseudo-KEEPALIVE message generator 2008 to generate a pseudo-KEEPALIVE message for preventing router 2000b from detecting the occurrence of the fault in router 2000a and to send the generated pseudo-KEEPALIVE message at defined transmission interval 6 until no router-down prediction information will be received.

In step S113, pseudo-KEEPALIVE message generator 2008 generates pseudo-KEEPALIVE message 8031 and sends generated pseudo-KEEPALIVE message 8031 to packet sorter 2003.

In step S114, packet sorter 2003 adds a header to pseudo-KEEPALIVE message 8031, packetizing them. In step S115, the packet including pseudo-KEEPALIVE message 8031 is sent as a routing protocol packet through IF 2001a to data communication path 2.

Thereafter, in step S116, the processing from step S113 to step S115 is repeated to send pseudo-KEEPALIVE messages 8032 through 8034 to router 2000b until no router-down prediction information will be received.

When no router-down prediction information is received from monitor 2010, the transmission of pseudo-KEEPALIVE messages is stopped.

In the above two exemplary embodiments, BGP is used as the routing protocol. However, OSPF (Open Shortest Path First) protocol or RIP (Routing Information Protocol) may be used as the routing protocol.

In the above two exemplary embodiments, furthermore, the criterion for determining whether the contents of a received UPDATE message are to be sent to an adjacent router or not is based on whether a load imposed due to a routing table updating process exceeds the processing capability of the CPU of the router which receives the UPDATE message or not. However, when the routing information of a packet communication network is changed by the maintenance of one router on the packet communication network, it is also possible to determine whether the contents of a received UPDATE message are to be sent to an adjacent router or not based on whether or not the routing information is to be deleted or updated temporarily due to the maintenance. The latter alternative process is effective to prevent the routing information from being changed wastefully.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A repeater for sending and receiving a routing message for changing routing information, comprising:
   a fault information receiver for receiving fault information sent from a first adjacent repeater which is disposed adjacent to said repeater;
   a repeating device for receiving a routing message from said first adjacent repeater and sending the received routing message to a second adjacent repeater which is disposed adjacent to said repeater;
   a repeating suppressor for analyzing the routing message from said first adjacent repeater and determining whether the routing message from said first adjacent repeater is to be sent or not; and
   a proxy responder for generating and sending a pseudo-routing message to said second adjacent repeater, instead of the routing message from said first adjacent repeater;
   wherein if said repeating suppressor judges that the routing message from said first adjacent repeater is to be sent, said repeating suppressor returns the routing message to said repeating device, and if said repeating suppressor judges that the routing message from said first adjacent repeater is not to be sent, said repeating suppressor does not return the routing message to said repeating device, and sends the result of analysis of the routing message to said fault information receiver;
   said repeating device sends the routing message returned from said repeating suppressor to said second adjacent repeater;
   said fault information receiver instructs said proxy responder to generate and send a pseudo-routing message based on the result of analysis of the routing message from said repeating suppressor or the fault information; and
   when instructed by said fault information receiver, said proxy responder generates the pseudo-routing message and sends the generated pseudo-routing message to said second adjacent repeater.

2. The repeater according to claim 1, wherein said repeating suppressor determines whether or not the routing message from said first adjacent repeater is to be sent based on the normality of the contents of the routing message from said first adjacent repeater.

3. The repeater according to claim 2, further comprising:
   a storage for storing the routing message from said first adjacent repeater;
   wherein said storage stores the routing message from said first adjacent repeater if said repeating suppressor judges that the routing message from said first adjacent repeater is to be sent.

4. The repeater according to claim 3, wherein said repeating suppressor determines whether or not the routing message from said first adjacent repeater is to be sent by comparing the contents of the routing message from said first adjacent repeater and the contents of the routing message stored in said storage.

5. The repeater according to claim 3, wherein said fault information receiver generates and sends said pseudo-routing message based on the routing message stored in said storage.

6. The repeater according to claim 1, wherein said repeating suppressor determines whether the routing message from said first adjacent repeater is to be sent or not based on the normality of the manner in which the routing message is received from said first adjacent repeater.

7. The repeater according to claim 6, wherein said repeating suppressor manages the period of time that has elapsed from the reception of the routing message from said first adjacent repeater.

8. The repeater according to claim 7, wherein said repeating suppressor judges that the routing message from said first adjacent repeater is not to be sent if the routing message from said first adjacent repeater has been received beyond a predetermined interval.

9. The repeater according to claim 7, wherein if said repeating suppressor has not received a next routing message from said first adjacent repeater beyond a predetermined time, said repeating suppressor sends a notice to that effect to said fault information receiver.

10. The repeater according to claim 8, wherein said fault information receiver instructs said proxy responder to send the pseudo-routing message to said second adjacent repeater at a predetermined interval.

11. The repeater according to claim 1, further comprising:
   a monitor for monitoring the operating status of said repeater, and sending said fault information to said fault information receiver if a fault of said repeater is detected.

12. The repeater according to claim 11, wherein said monitor continuously sends the fault information to said fault information receiver until recovery from a fault of said repeater is made.

13. A communication method to be carried out by a repeater for sending and receiving a routing message for changing routing information, comprising the steps of:

receiving fault information sent from a first adjacent repeater which is disposed adjacent to said repeater;

analyzing the routing message from said first adjacent repeater and determining whether or not the routing message from said first adjacent repeater is to be sent;

if it is judged that the routing message from said first adjacent repeater is to be sent, sending the routing message to a second adjacent repeater which is disposed adjacent to said repeater;

if it is judged that the routing message from said first adjacent repeater is not to be sent, generating a pseudo-routing message to be sent to said second adjacent repeater, instead of the routing message from said first adjacent repeater, based on a result of analysis of the routing message or fault information sent from said first adjacent repeater;

sending the generated pseudo-routing message to said second adjacent repeater;

storing the routing message from said first adjacent repeater if it is judged that the routing message from said first adjacent repeater is to be sent, by determining whether or not the routing message from said first adjacent repeater is to be sent by comparing the contents of the routing message from said first adjacent repeater and the contents of the stored routing message, wherein said step of determining whether or not the routing message from said first adjacent repeater is to be sent comprises the step of determining whether or not the routing message from said first adjacent repeater is to be sent based on the normality of the contents of the routing message from said first adjacent repeater.

14. The communication method according to claim 13, wherein said step of generating the pseudo-routing message comprises the step of generating the pseudo-routing message based on the stored routing message.

15. The communication method according to claim 13, further comprising the steps of:

monitoring an operating status of said repeater; and outputting said fault information if a fault of said repeater is detected.

16. The communication method according to claim 15, wherein said step of outputting said fault information comprises the step of:

continuously outputting said fault information until recovery from a fault of said repeater is made.

17. The communication method according to claim 13, wherein said step of determining whether or not the routing message from said first adjacent repeater is to be sent comprises the step of determining whether or not the routing message from said first adjacent repeater is to be sent based on the normality of the manner in which the routing message is received from said first adjacent repeater.

18. The communication method according to claim 17, further comprising the step of:

managing a period of time that has elapsed from the reception of the routing message from said first adjacent repeater.

19. The communication method according to claim 18, wherein it is judged that a routing message from said first adjacent repeater is not to be sent if the routing message from said first adjacent repeater has been received beyond a predetermined interval.

20. The communication method according to claim 19, wherein said step of sending the generated pseudo-routing message to said second adjacent repeater comprises the step of:

sending the pseudo-routing message to said second adjacent repeater at a predetermined interval.

21. The communication method according to claim 18, wherein said step of generating the pseudo-routing message comprises the step of generating the pseudo-routing message if said repeater has not received a next routing message from said first adjacent repeater beyond a predetermined time.

* * * * *